Dec. 6, 1955

W. H. DEXTER 2,725,689

APPARATUS FOR GRINDING THE EDGES OF EYEGLASS
LENSES AND LIKE WORKPIECES

Filed Sept. 13, 1951

Inventor
Wilbur H. Dexter
By Fred Gerlach
atty.

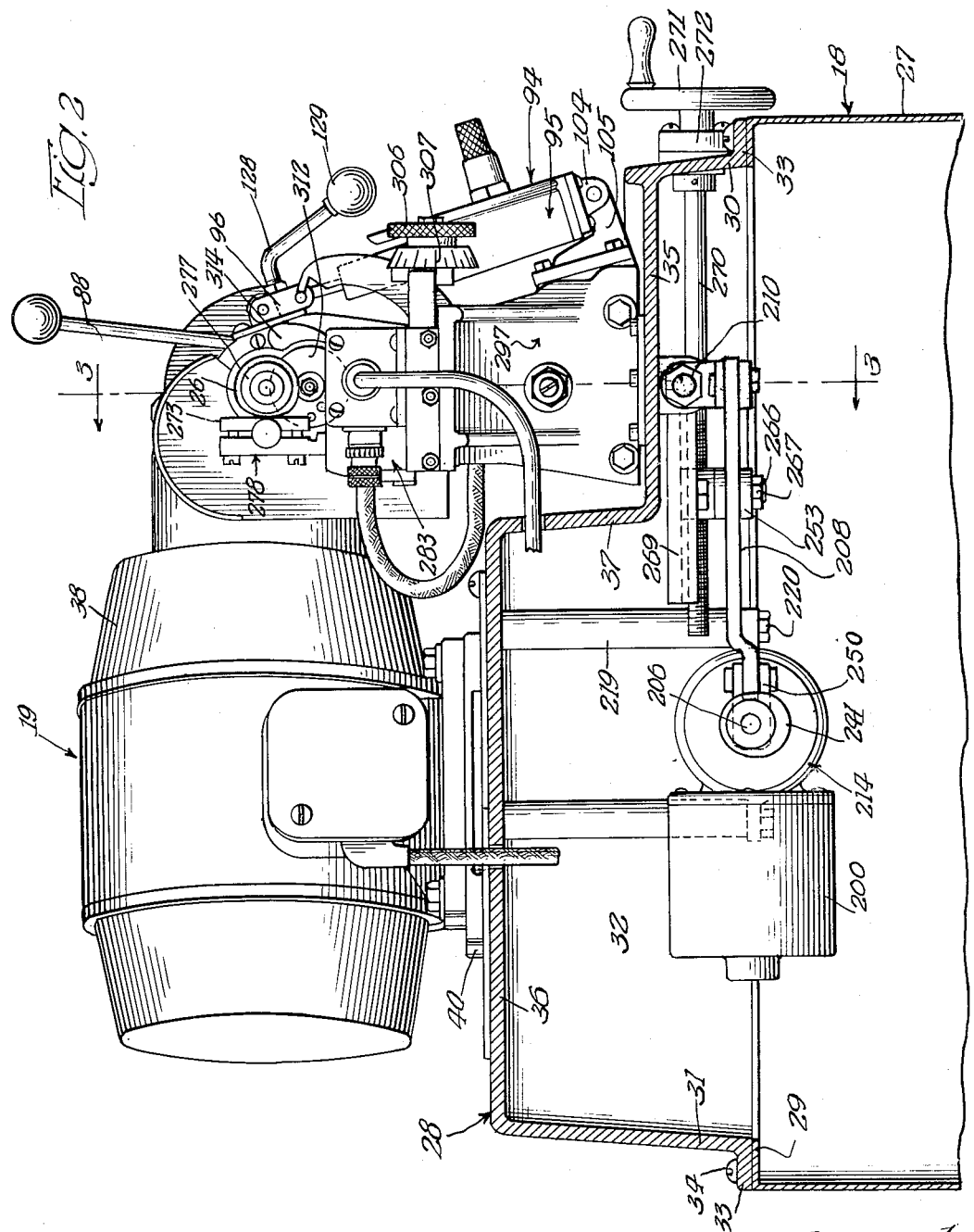

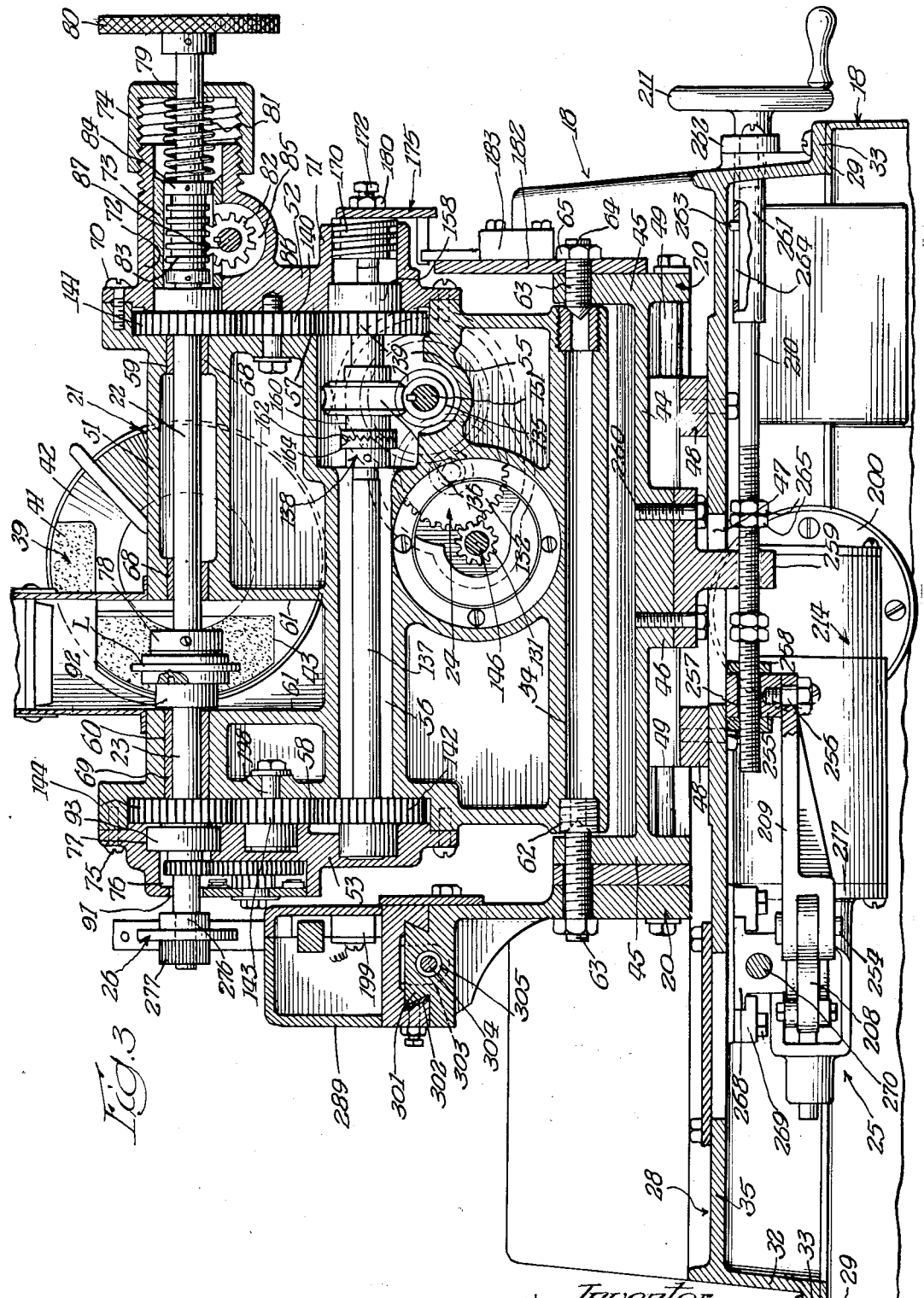

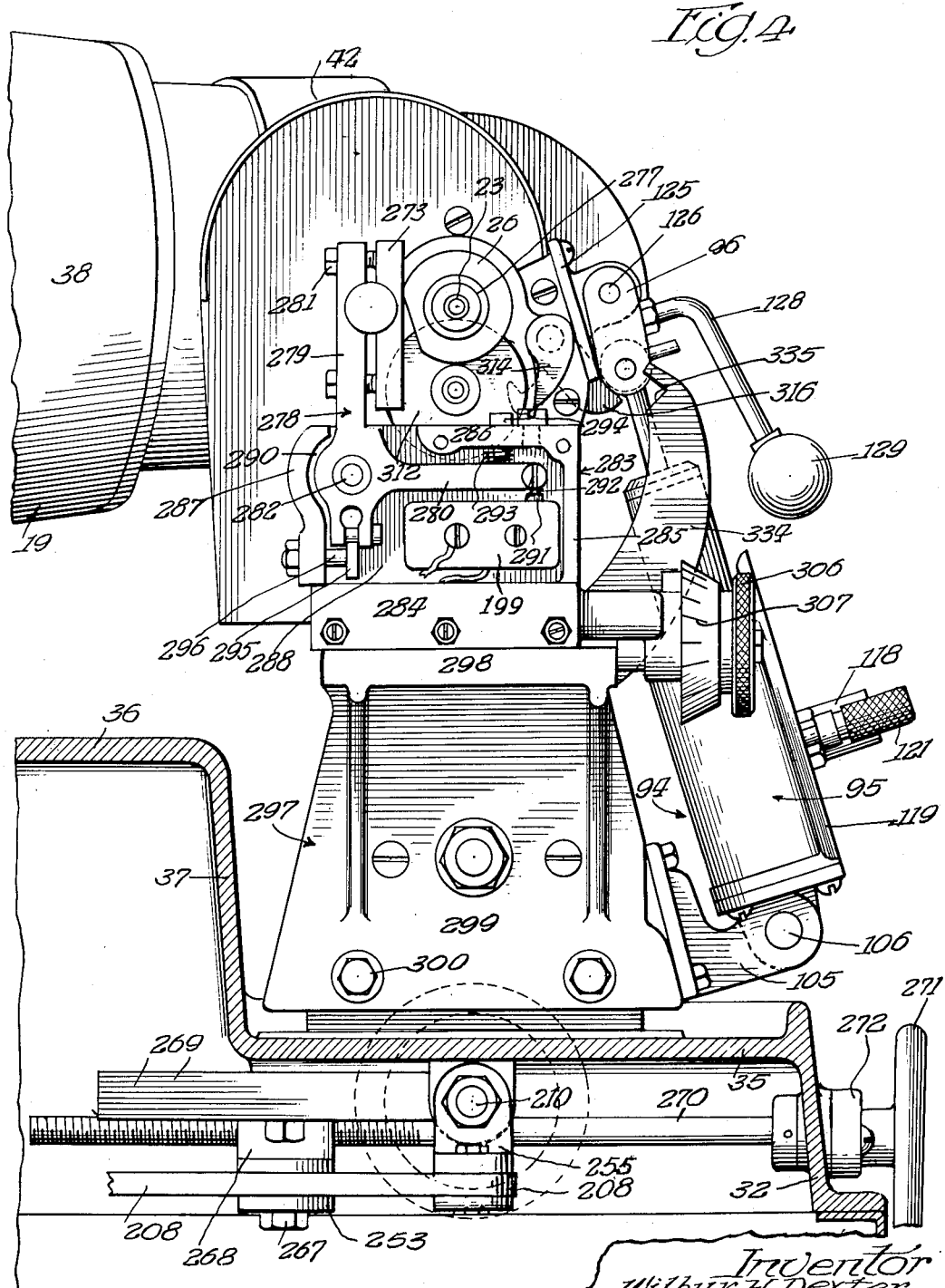

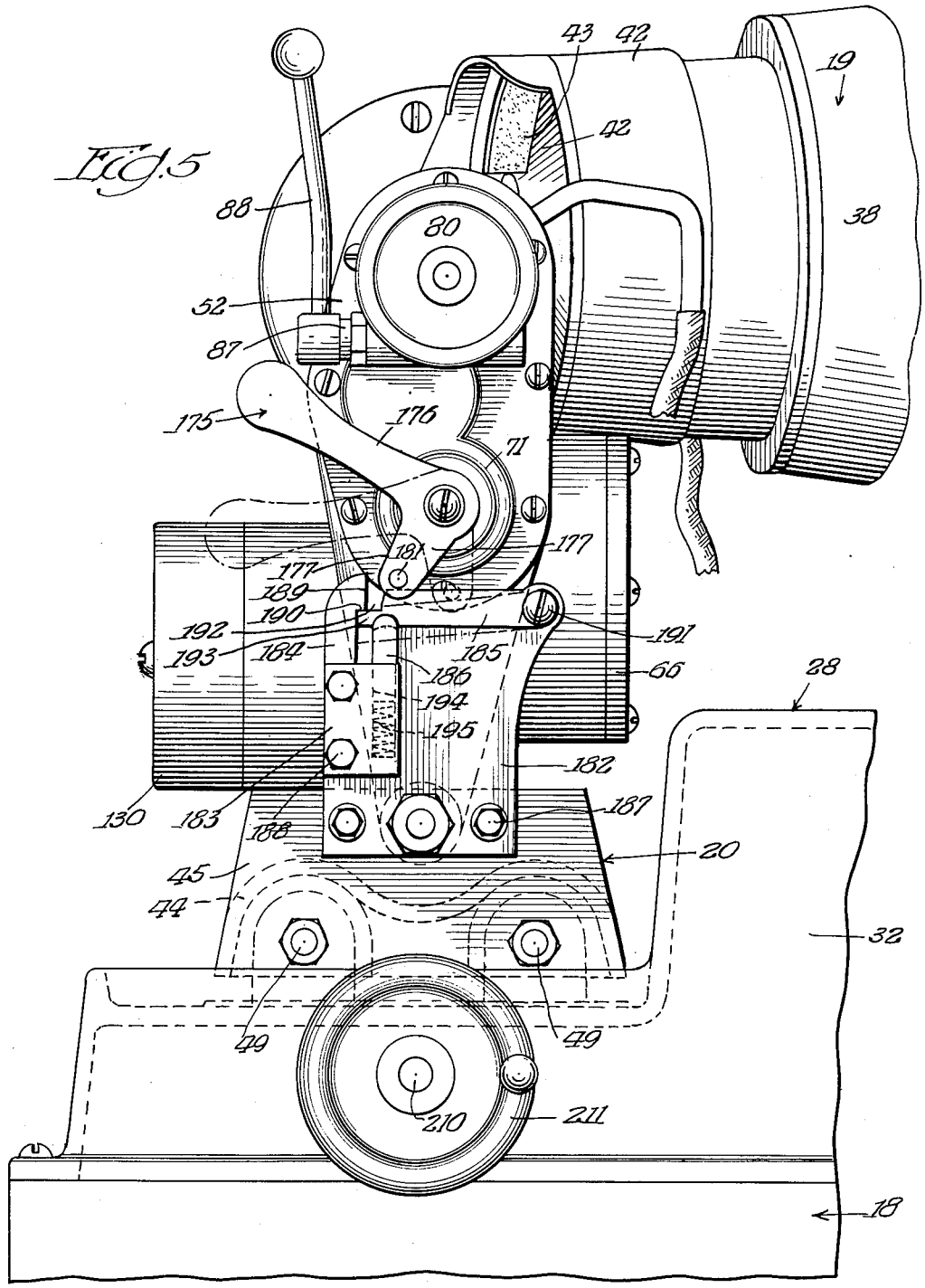

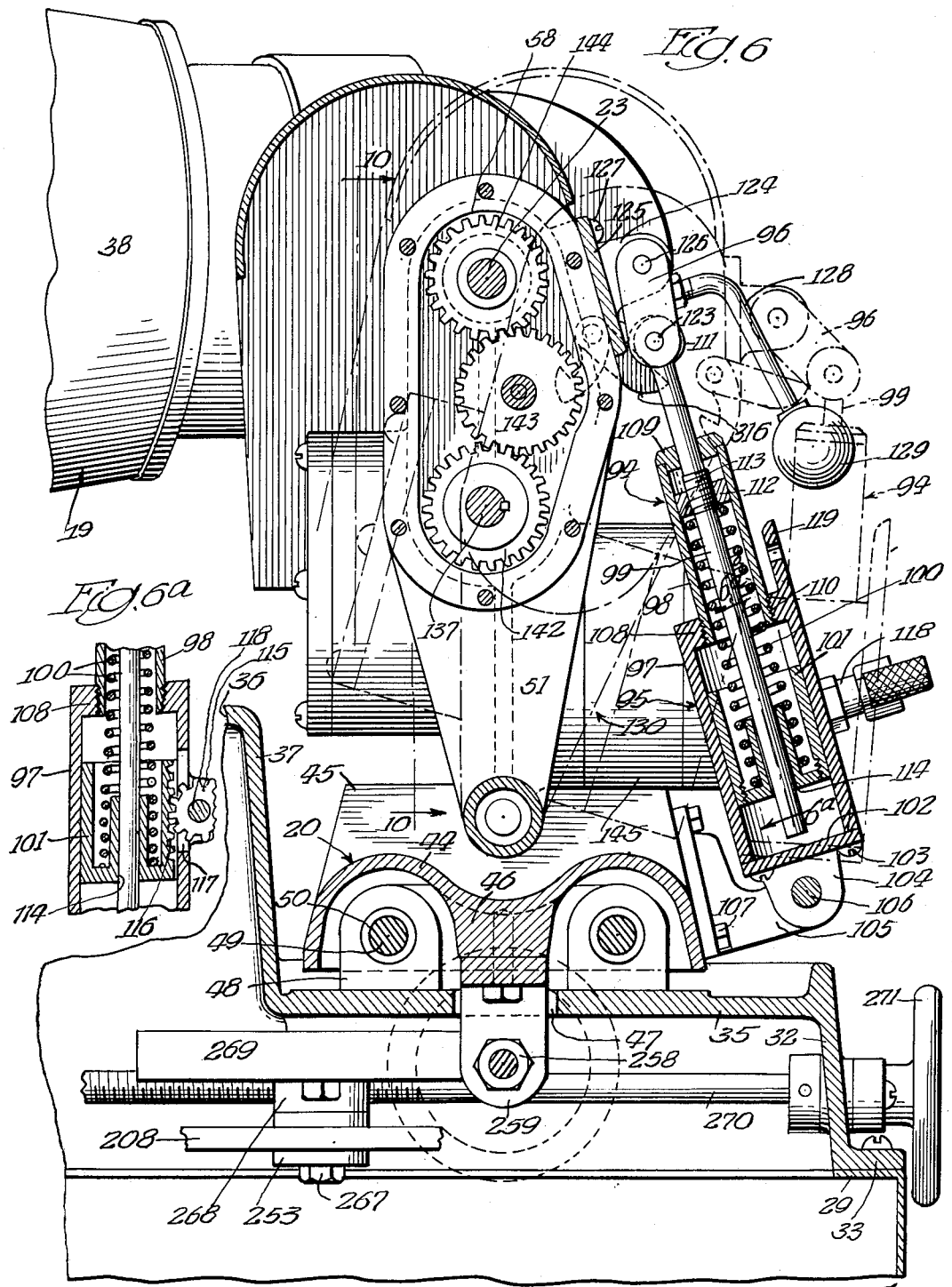

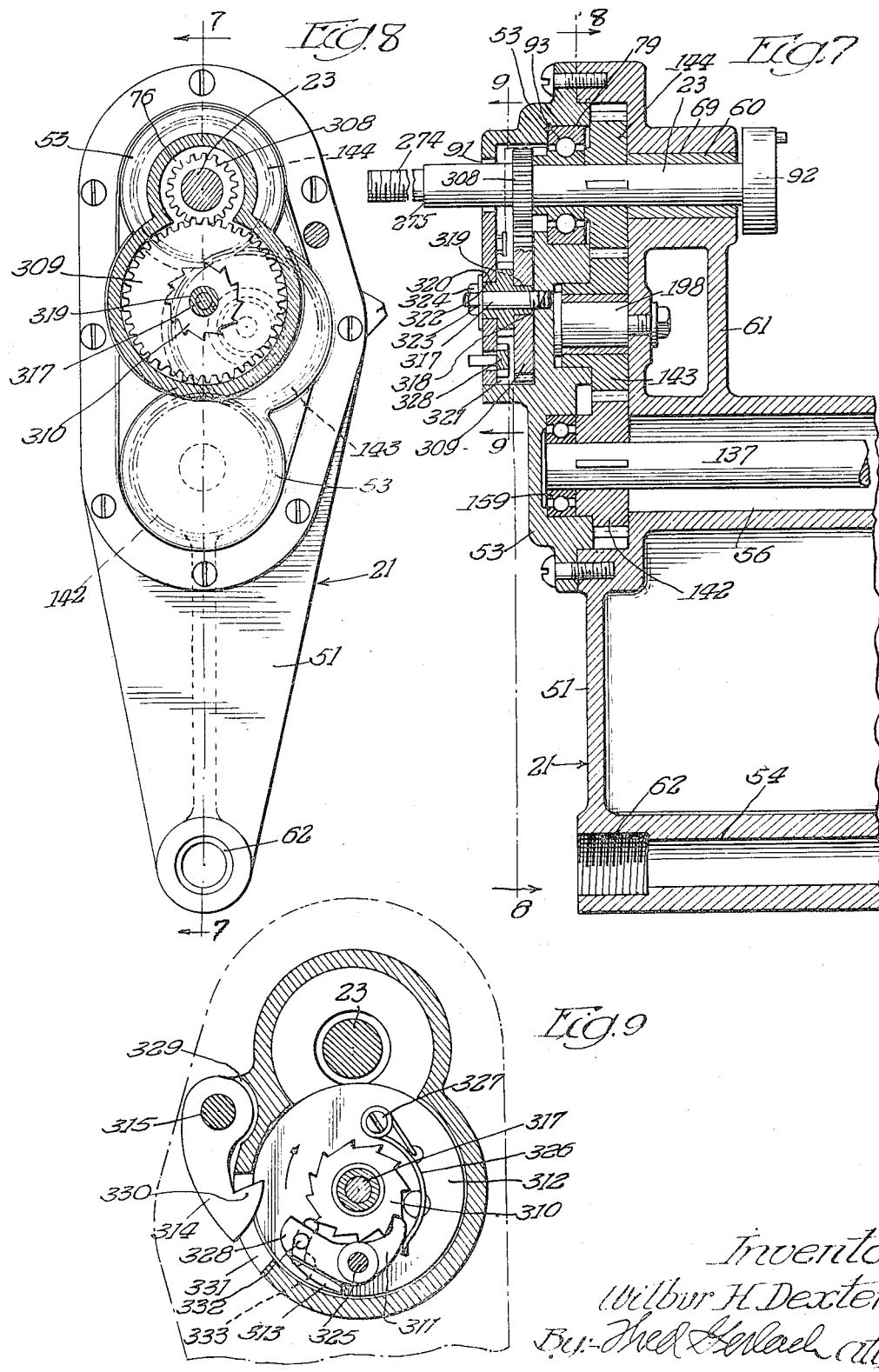

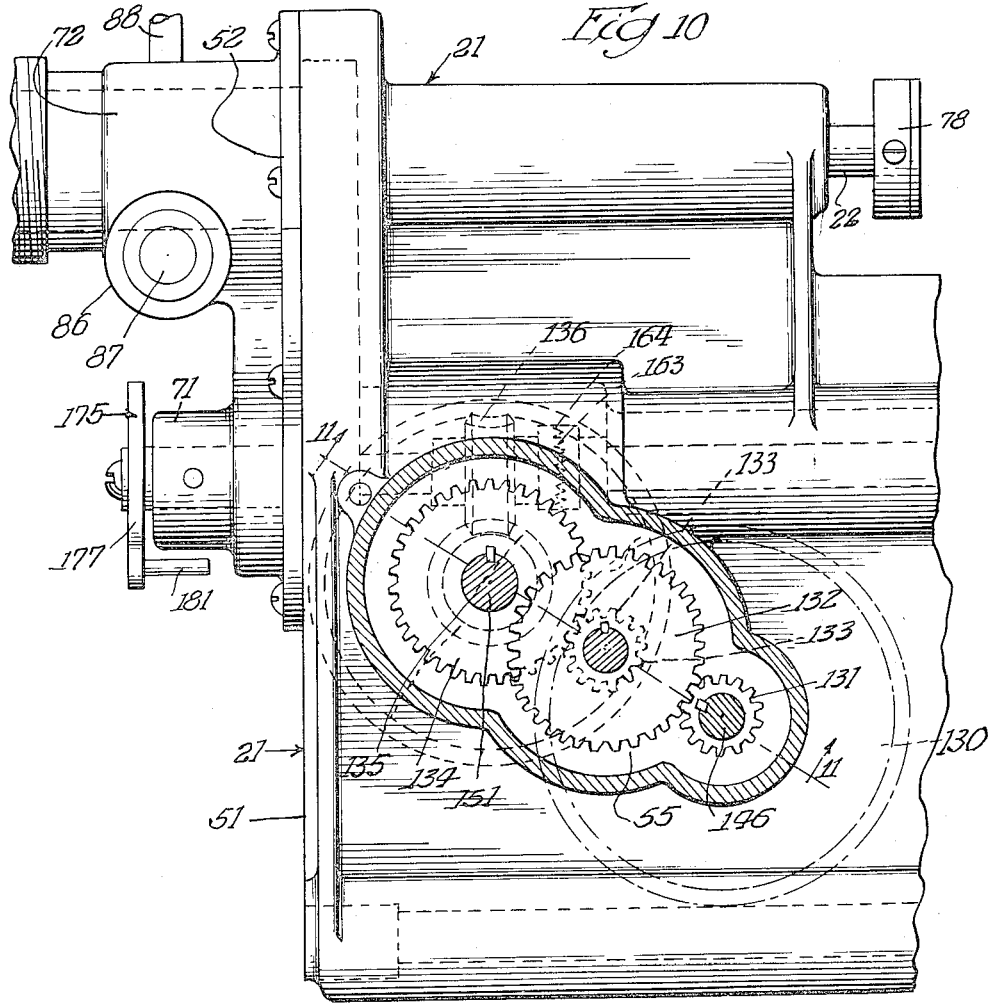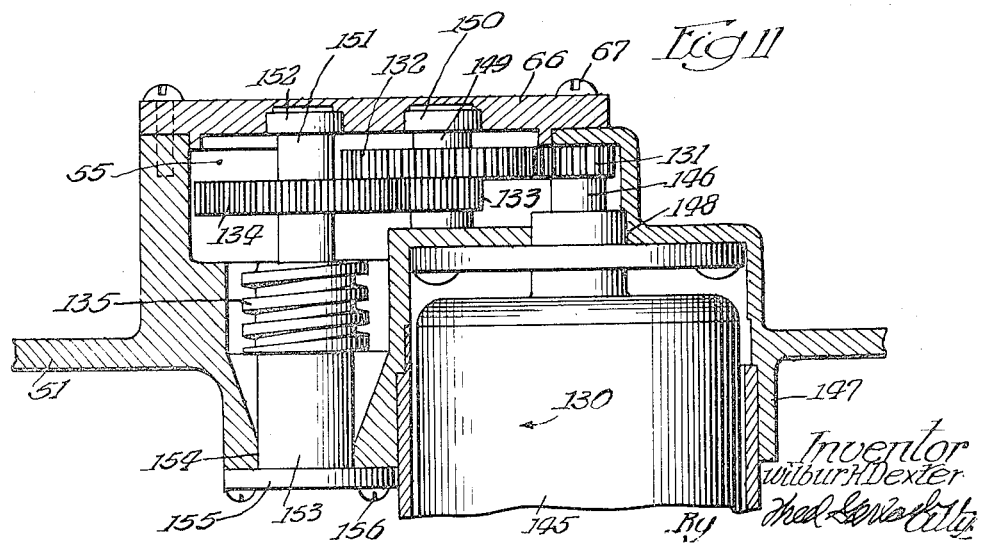

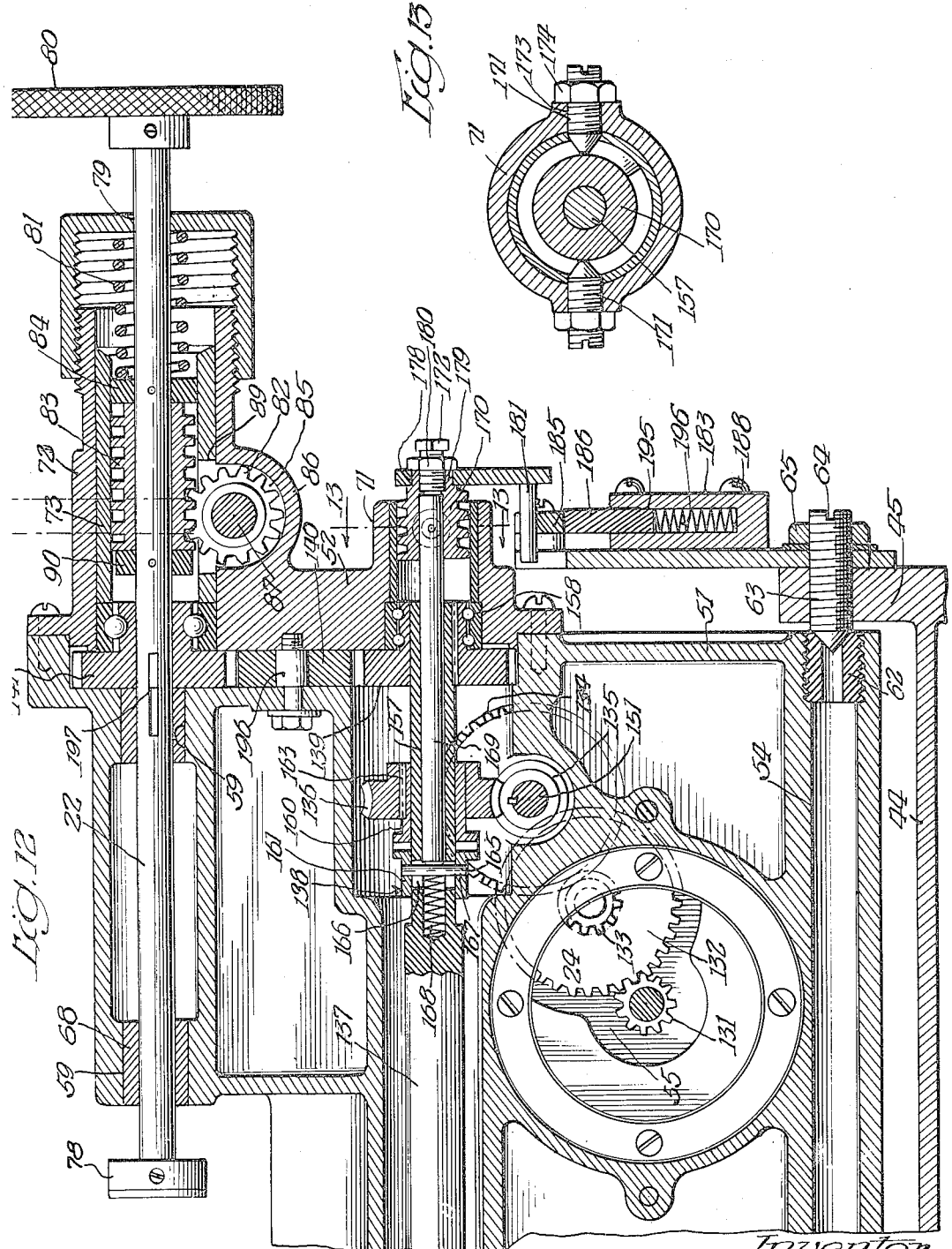

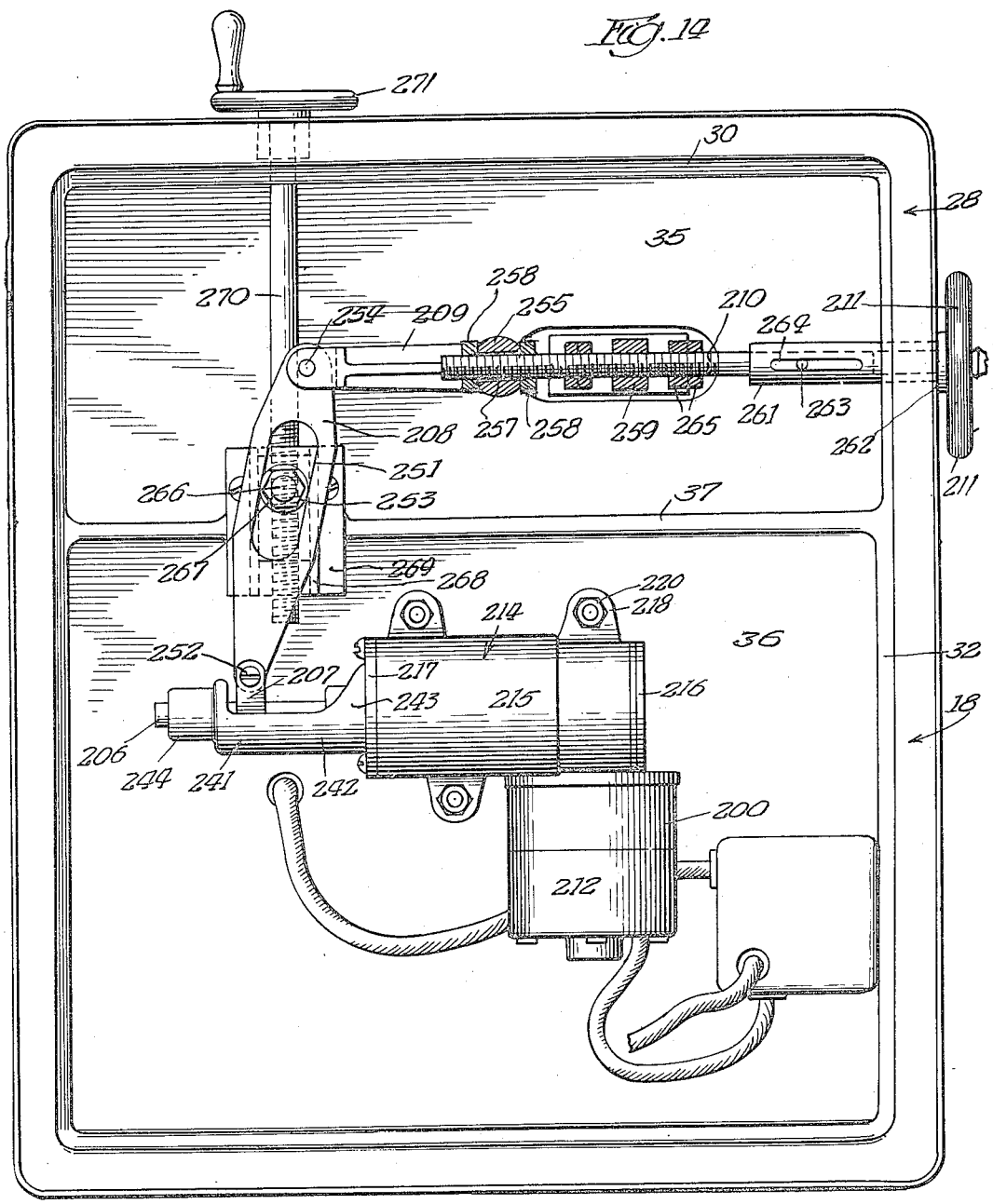

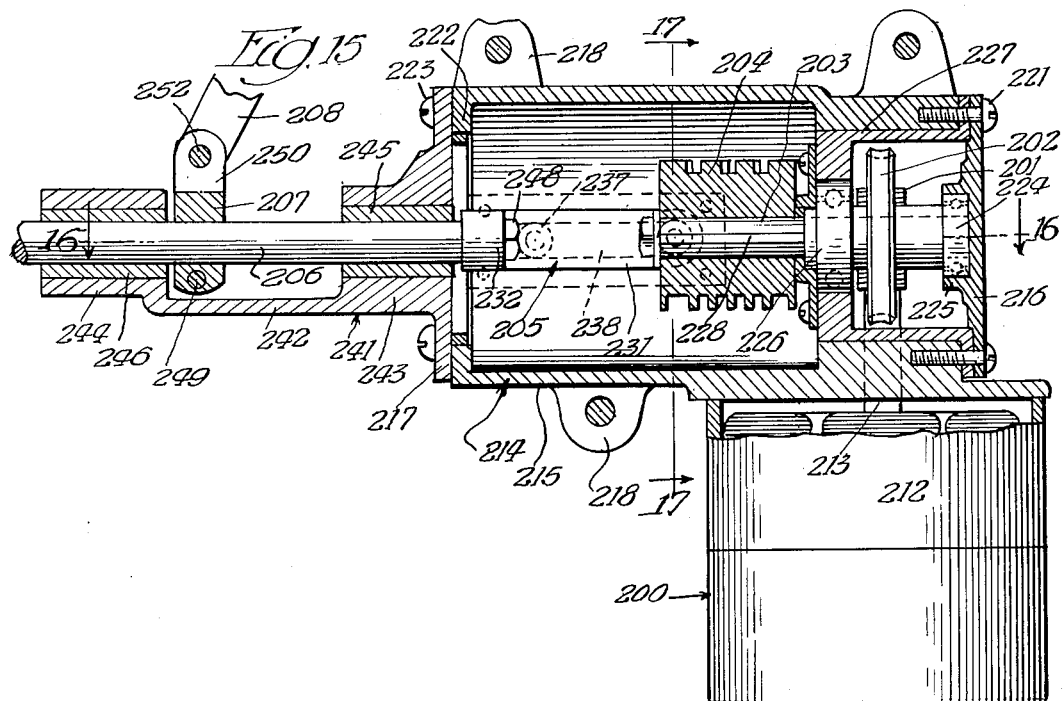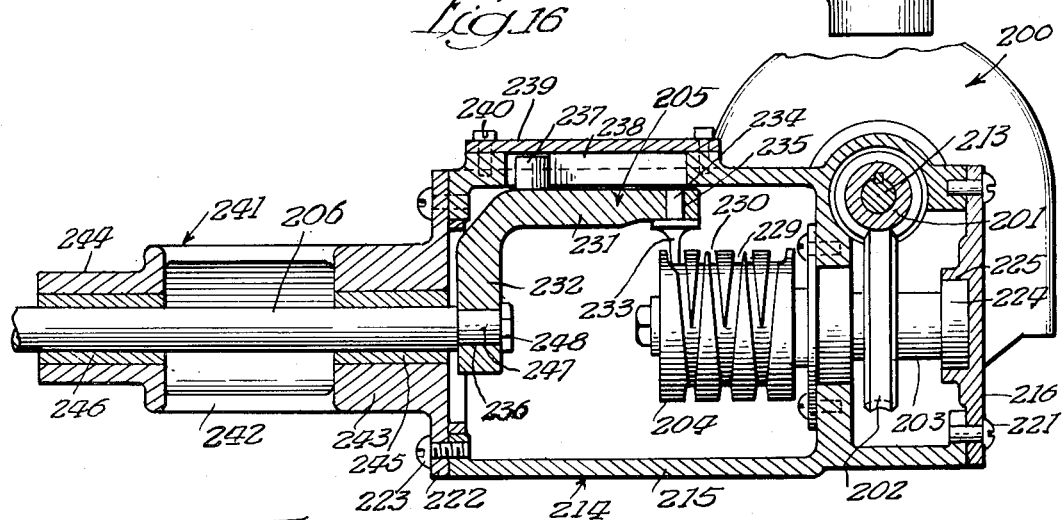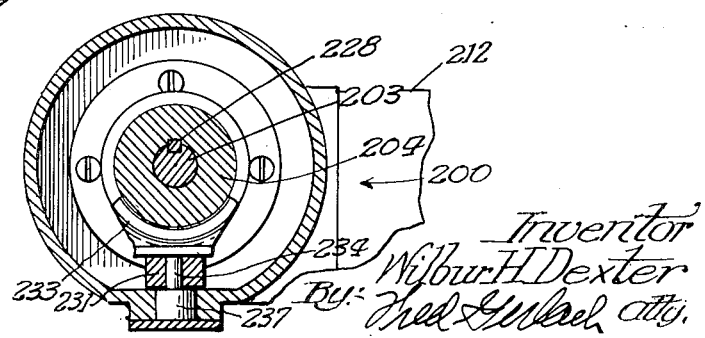

United States Patent Office 2,725,689
Patented Dec. 6, 1955

2,725,689

APPARATUS FOR GRINDING THE EDGES OF EYEGLASS LENSES AND LIKE WORKPIECES

Wilbur H. Dexter, Hawthorne, Calif., assignor to Super-Cut, Inc., Chicago, Ill.

Application September 13, 1951, Serial No. 246,445

10 Claims. (Cl. 51—101)

The present invention relates generally to grinding apparatus. More particularly the invention relates to that type of apparatus which is designed primarily to grind the edges of eyeglass lenses to a predetermined contour and as its principal components or parts comprises: (1) a supporting structure; (2) a motor and grinding wheel assembly which is mounted on the top portion of the supporting structure so that the axis of the grinding wheel is disposed horizontally; (3) an upstanding horizontally elongated head which is disposed in front of the motor and grinding wheel assembly, embodies on its upper portion a pair of longitudinally extending, horizontally disposed, coaxial spindles with chucks on their inner ends for holding between them an eyeglass lens, the edge of which is to be ground, and is mounted or supported so that it is capable of swinging laterally into and out of an operative position wherein the edge of the chuck held lens is in contacting relation with the grinding wheel and is also capable of sliding longitudinally back and forth in order to cause the lens, in connection with a grinding operation, to traverse the grinding wheel; (4) motor driven gearing which operates when actuated while the head is in its operative position conjointly to drive the spindles in order to rotate the chuck held lens and thus bring different portions of its edge into engagement or contact with the grinding wheel; and (5) a template which is operatively connected to the outer end of one of the spindles so as to rotate conjointly with the one spindle, is shaped conformably to the desired or predetermined contour for the lens, and operates in conjunction with an anvil so to control the edge grinding operation that the lens when fully ground has the same contour as the template.

One object of the present invention is to provide a grinding apparatus of this type which is an improvement upon, and has certain inherent advantages over, previously designed apparatus for grinding the edges of eyeglass lenses and is characterized by high efficiency, extremely fast operation and a novel and compact arrangement of parts.

Another object of the invention is to provide a grinding apparatus of the aforementioned type in which the lower portion of the spindle carrying head is pivotally connected to a horizontally elongated carriage which extends lengthwise of the head, is mounted on the supporting structure for longitudinal sliding movement in a horizontal plane, has associated with it motor actuated mechanism for sliding it back and forth and operates in connection with back and forth sliding movement to effect back and forth longitudinal sliding movement of the head and resultant traversing of the lens to be ground with respect to the grinding wheel.

Another object of the invention is to provide a grinding apparatus of the last mentioned character in which the motor actuated mechanism for sliding the carriage back and forth comprises a centrally fulcrumed lever and, in addition, means whereby the fulcrum may be adjusted lengthwise of the lever in order to increase or decrease as desired the back and forth sliding stroke of the carriage.

Another object of the invention is to provide a grinding apparatus of the type and character under consideration in which the motor actuated mechanism for reciprocating or sliding back and forth the carriage includes means for adjusting the position of the carriage with respect to the mechanism to the end that the position of traverse of the lens with respect to the grinding wheel may be changed or varied.

Another object of the invention is to provide a grinding apparatus of the aforementioned type in which the spindle carrying head has associated with it an upstanding toggle linkage which comprises a lower spring variety compound link having its lower end pivotally connected to the carriage and an upper rigid link having its upper end pivotally connected to the upper portion of the head and its lower end pivotally connected to the upper end of the lower link, and is so constructed and arranged that when the links are shifted in one direction past dead center they serve yieldingly to hold the head in its operative position and when the links are shifted in the opposite direction beyond dead center they serve to hold the head in its inoperative position wherein the chuck held lens is out of engagement with the grinding wheel of the assembly.

Another object of the invention is to provide a grinding apparatus of the last mentioned character in which the lower spring variety link of the upstanding linkage between the supporting structure and the head has associated with it means for adjusting the loading of its spring in order that when the head is in its operative position the force tending to hold the lens to be ground against the grinding wheel of the assembly may be varied.

Another object of the invention is to provide a grinding apparatus of the aforementioned type in which the motor driven gearing for conjointly driving the coaxial spindles is mounted entirely on the head and comprises irreversible worm gearing and spur gears between the worm gearing and the spindles and, in addition, a clutch which is disposed between the worm gearing and the spur gears and is adapted, when the coacting parts thereof are in de-clutched position, to permit the spindles to be turned manually by way of a hand wheel on one of the spindles.

Another object of the invention is to provide a grinding apparatus of the last mentioned character which includes means for automatically effecting declutching of the clutch when the spindle carrying head is swung into its inoperative position.

Another object of the invention is to provide a grinding apparatus of the type and character under consideration in which the motor for driving the gearing for the coaxial spindles on the head is an electric motor and has a micro-switch for controlling it, and the anvil which coacts with the rotary template is mounted on one arm of a bell crank and is so arranged that when contacted by the template it operates through the medium of the bell crank to close the micro-switch for the electric motor.

A further object of the invention is to provide a grinding apparatus of the aforesaid type which comprises means whereby the head is automatically swung into its inoperative position after the template has been turned or rotated to a predetermined extent in excess of a 360° arc.

A still further object of the invention is to provide a lens edge grinding apparatus which is generally of new and improved construction and effectively and efficiently fulfills its intended purpose.

Other objects of the invention and the various advantages and characteristics of the present grinding apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 2 is a vertical transverse section on the line 2—2 of Figure 1;

Figure 3 is a vertical longitudinal section taken on the line 3—3 of Figure 2 and illustrating in detail the construction and general design of the spindle carrying head and the motor driven gearing for conjointly driving the spindles;

Figure 4 is an enlarged vertical transverse section taken on the line 4—4 of Figure 1 and showing the arrangement of the template and coacting anvil and the construction and design of certain of the parts of the means for automatically swinging the head into its inoperative position after turning or rotation of the template beyond a 360° arc;

Figure 5 is an enlarged right hand side elevation of the apparatus, illustrating in detail the construction and design of certain parts of the means whereby, when the head is swung into its inoperative position, the coacting parts of the clutch of the motor driven gearing for the spindles are declutched so as to free or release the spindles for manual turning;

Figure 6 is an enlarged vertical transverse section taken on the line 6—6 of Figure 1 and showing in detail the construction, design and arrangement of the upstanding toggle type linkage between the supporting structure and the head;

Figure 6A is a section on the line 6A—6A of Figure 6;

Figure 7 is an enlarged vertical longitudinal section of the left hand end portion of the head, taken on the line 7—7 of Figure 8 and showing the arrangement of the spur gears for driving the spindle on such end portion of the head;

Figure 1:
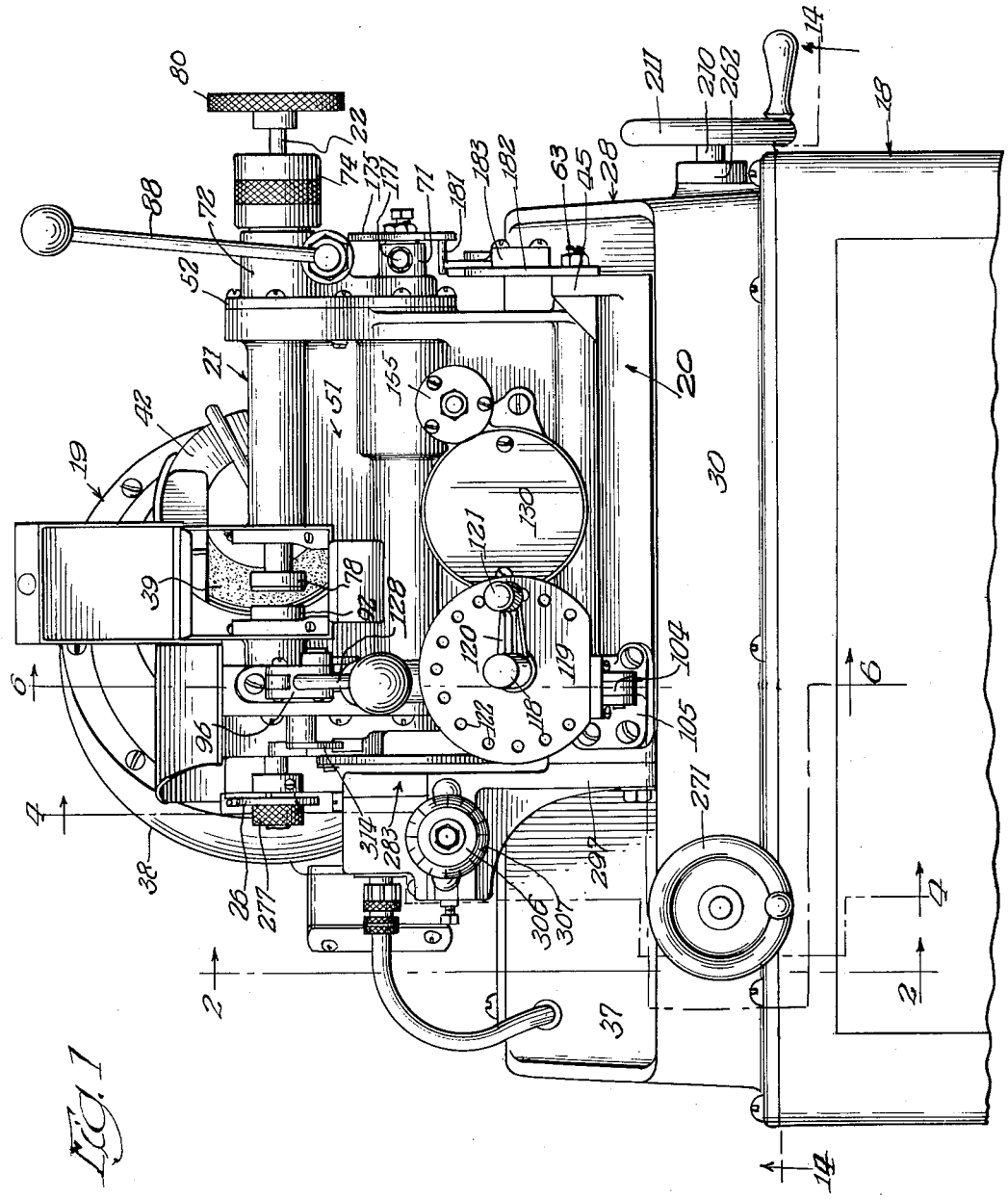
Figure 1 is a fragmentary front elevation of a lens edge grinding apparatus embodying the invention.

Figures 8 and 9 are vertical transverse sections taken respectively on the lines 8—8 and 9—9 of Figure 7;

Figure 10 is a section taken on the line 10—10 of Figure 6 and showing in detail the arrangement of certain other gears of the motor driven gearing for conjointly driving the coaxial spindles on the head;

Figure 11 is a section on the line 11—11 of Figure 10;

Figure 12 is an enlarged vertical longitudinal section of the right hand end portion of the head, illustrating in detail the construction, design and arrangement of the clutch which constitutes a part of the motor driven gearing for the spindles and is disposed between the worm gearing of such gearing and the spur gears between the worm gearing and the spindles;

Figure 13 is an enlarged vertical transverse section taken on the line 13—13 of Figure 12 and showing in detail other parts of the means for automatically effecting declutching of the clutch when the head is shifted or swung into its inoperative position;

Figure 14 is a horizontal section taken on the line 14—14 of Figure 1 and disclosing the design and arrangement of the motor actuated mechanism for reciprocating or sliding back and forth the carriage to which the head is pivotally connected;

Figure 15 is a bottom view partly in elevation and partly in horizontal section of certain parts of the mechanism for reciprocating the carriage; and Figures 16 and 17 are sections taken respectively on the lines 16—16 and 17—17 of Figure 15.

The apparatus which is shown in the drawings constitutes the preferred form or embodiment of the invention. It is designed primarily to grind the edge of an eyeglass lens L to a predetermined desired contour and comprises as its principal components a box-like supporting structure 18, a motor and grinding wheel assembly 19, a horizontally elongated longitudinally slidable carriage 20 in front of and below the assembly, an upstanding horizontally elongated head 21 over the carriage and with a pair of horizontal longitudinally extending coaxial spindles 22 and 23 on its upper portion, motor driven gearing 24 for conjointly driving the spindles, motor actuated mechanism 25 for reciprocating or sliding back and forth the carriage, and a template 26.

*Supporting structure*

The structure 18 serves as a supporting medium or instrumentality for the various other parts of the apparatus and is adapted to rest on the floor of the establishment in which the apparatus is used. It is rigid and consists of a rectangular base 27 and a top member 28. The base 27 consists of vertically extending front, side and back walls and has a continuous inwardly extending right angle flange 29 at its upper end. An opening is formed in the front wall of the base 27 in order to provide access to the interior of the supporting structure. The top member 28 is preferably in the form of a one-piece casting and consists of a front wall 30, a back wall 31, a pair of side walls 32 and a top wall. The lower marginal portions of the front, back and side walls are provided with an integral outwardly extending flange 33 which is shaped conformably to, and rests on, the inwardly extending flange 29 and is secured to the latter by screws 34. The top wall of the top member 28 is of stepped formation and consists of a low horizontally extending front portion 35, an elevated horizontally extending rear portion 36 and a vertically extending intermediate portion 37 between the rear margin of the low portion 35 and the front margin of the elevated portion 36. The upper margins of the side walls 32 are shaped conformably to, and are formed integrally with, the side margins of the top wall of the top member 28.

*Motor and grinding wheel assembly*

The motor and grinding wheel assembly 19 of the apparatus is located over the top member 28 of the supporting structure 18 and consists of an electric motor 38 and a grinding wheel 39. The motor is arranged so that the armature shaft thereof extends horizontally and is positioned at a small acute angle with respect to a vertical plane at right angles to the front and back walls of the base 27 of the supporting structure. The casing of the motor 38 overlies, and is suitably secured to, a bed plate 40 which is supported on, and bolted to, the elevated rear portion 36 of the top wall of the top member 28. The grinding wheel 39 of the assembly 19 is fixedly connected to the front end of the armature shaft of the electric motor 38 and embodies at the front thereof a frusto-conical grinding surface 41. The latter operates when the wheel is driven while the eyeglass lens L is in contact therewith to grind the edge of the lens and is preferably in the form of a metal matrix and crushed or fragmented diamond particles distributed substantially uniformly throughout the matrix. The assembly 19 is so angularly arranged that the portion of the frusto-conical grinding surface 41 that is engaged by the lens L in connection with an edge grinding operation is in parallel relation with the front wall of the base 27 of the supporting structure. A cup-shaped sheet metal guard 42 surrounds the grinding wheel 39 and has an opening 43 in its cross wall whereby the grinding or operative portion of the grinding surface 41 is exposed. It is contemplated that in connection with an edge grinding operation any suitable liquid coolant will be continuously supplied to the grinding surface 39. The guard 42 serves not only as a protecting medium but also to prevent splashing of the liquid coolant. The electric motor 38 of the assembly 19 is included in a suitable electric circuit having a switch (not shown) which is mounted at any convenient location on the supporting structure 18.

Carriage

The carriage 20 overlies and extends lengthwise of the low front portion 35 of the top wall of the top member 28 and consists of a horizontally extending wall 44 and a pair of vertically extending end walls 45 at the ends of the horizontally extending wall 44. Preferably the carriage 20 is in the form of a one-piece casting since it is of unitary character. The horizontally extending wall 44 is substantially M-shaped in cross section (see Figure 6) and embodies on its central portion and midway between its side margins an integral depending lug 46 which overlies a longitudinally extending slot 47 in the central portion of the low front portion 35 of the top wall of the top member 28. The upper portions of the end walls 45 of the carriage 20 project above the horizontally extending wall 44 and the central parts of the lower portions of the end walls project beneath the central part of said horizontally extending wall.

The carriage 20 is mounted for longitudinal sliding movement by way of a rectangular frame 48 and a pair of laterally spaced apart horizontally extending parallel rods 49. The frame 48 rests on, and is bolted or otherwise fixedly secured to, the central portion of the low front portion 35 of the top wall of the top member 28 and surrounds or encompasses the slot 47. It is preferably in the form of a one-piece casting and is arranged so that its side parts extend lengthwise of the carriage. Such side parts of the frame 48 are provided with longitudinally extending open ended bores 50. The central portions of the rods 49 extend through and are slidably mounted in the bores 50 and the ends of the rods are suitably connected to the lower portions of the end walls 45 of the carriage 20.

As hereinafter described more in detail the carriage 20 is reciprocated or slid back and forth by the motor actuated mechanism 25 in order to cause the lens L in connection with an edge grinding operation to traverse the grinding surface 41 of the wheel 39.

Spindle carrying head

The head 21 of the apparatus overlies and extends lengthwise of the slidably mounted carriage 20 and is of composite character in that it consists of a main member 51 and a pair of end members 52 and 53. Each of these members is preferably in the form of a one-piece casting.

The main member 51 of the head is generally rectangular so far as configuration is concerned and is shaped and machined so that it embodies a horizontal longitudinally extending bore 54 with counterbored ends, an open sided gear compartment 55, a horizontal longitudinally extending shaft compartment 56, an open ended gear compartment 57, an open ended gear compartment 58, a horizontal longitudinally extending bore 59, a horizontal longitudinally extending bore 60 in axial alignment with the bore 59, and a vertically elongated open sided lens receiving space 61 between the inner ends of the bores 59 and 60. The lower portion of the main member 51 of the head is disposed between the upper portions of the vertically extending end walls 45 of the carriage 20 and has formed in it the horizontal longitudinally extending bore 54. The latter has mounted in its counterbored ends a pair of coaxial bushings 62 which are secured in place by screw thread connections. Two horizontal coaxial studs 63 coact with the bushings 62 to form pivotal connections between the head and the carriage whereby the head is permitted to swing laterally toward and away from the grinding wheel 39 of the assembly. Such studs extend transversely through screw threaded holes in the upper central portions of the vertically extending end walls 45 of the carriage 20 and have tapered inner ends which, as shown in Figure 3 of the drawings, fit within the outer ends of the bushings 62. The outer ends of the studs are provided with diametric kerfs 64 whereby the studs may be turned for axial adjustment by way of a screw driver or other turning tool. They also are provided with lock nuts 65 for securing the studs in place after they have been axially adjusted so as properly to position the tapered inner ends thereof with respect to the outer ends of the bushings. The gear compartment 55 is formed in the lower portion of the main member 51 as best shown in Figures 3, 10 and 12. It is elongated and extends upwards at approximately a 45° angle in the direction of the right hand side of the head as viewed in Figures 3 and 4. The lower end of the gear compartment 55 is disposed directly over the central portion of the bore 54. The open side of the gear compartment 55 is at the rear of the head 21 and is closed by a plate 66 which is removably secured in place by means of screws 67 (see Figure 11). The horizontal longitudinally extending shaft compartment 56 is formed in the central portion of the main member 51 of the head and has the right hand end thereof as viewed in Figure 3 in communication with the upper end of the gear compartment 55. The open ended gear compartment 57 is vertically elongated and has the lower end thereof in communication with the outer end of the gear compartment 55. It is formed in the right hand end portion of the main member 51 and extends upwards to the upper right hand corner of the main member. The open ended gear compartment 58 is vertically elongated and has the lower end thereof in communication with the left hand end of the shaft compartment 56. It is formed in the left hand portion of the main member 51 and extends upwards to the upper left hand corner of the main member as shown in Figure 3. The horizontal longitudinally extending bore 59 is formed in the upper right hand corner of the main head member 51 and extends between and communicates with the upper end of the gear compartment 57 and the central portion of the lens receiving space 61. It overlies and is spaced above the upper end of the gear compartment 55 and the right hand end of the shaft compartment 56 and has sleeve-like bearings 68 in its ends. The horizontal longitudinally extending bore 60 is formed in the upper left hand corner portion of the main member 51 of the head and extends between, and communicates with, the upper end of the gear compartment 58 and the central portion of the lens receiving space 61. It overlies and is spaced above the left hand end of the shaft compartment 56 and has mounted therein a sleeve-like bearing 69. The lens receiving space 61 is formed in the upper central portion of the main head member 51 and is aligned with the left hand portion of the grinding surface 41 of the grinding wheel 39 as viewed in Figure 3.

The end member 52 of the head 21 is vertically elongated and extends across, and serves to close, the outer open end of the gear compartment 57. It is removably secured to the upper portion of the right hand end of the main head member 51 by screws 70 and embodies a horizontal outwardly extending tubular extension 71 at its lower end and a horizontal outwardly extending tubular extension 72 at its upper end. The extension 71 is open ended and communicates at its inner end with the lower end of the gear compartment 57. The tubular extension 72 of the end member 52 is also open ended and communicates at its inner end with the upper end of the gear compartment 57. It has mounted in its central portion a sleeve-like bearing 73 and embodies at its outer end a cup-shaped nut 74. The other end member of the head 21, i. e., the end member 53, is vertically elongated and extends across, and serves to close, the open outer end of the vertically elongated gear compartment 58. It is removably secured in place by means of screws 75 which extend through the marginal portion of the end member 53 into screw threaded sockets in the upper portion of the left hand end of the main head member 51. The outer upper portion of the end member 53 is shaped to form a vertically elongated gear compartment 76, the upper end of which communicates with the upper end of the gear compartment 58 by way of a circular opening 77.

The horizontal longitudinally extending spindle 22 is located at the upper right hand corner of the head 21 and is arranged so that the inner end portion thereof extends through the bore 59 and is journalled in the bearings 68. Its central portion extends through the upper end of the gear compartment 57 and its outer end portion extends through the tubular extension 72. The inner end of the spindle 22 is disposed in the central portion of the space 61 and embodies a chuck 78 for gripping one side of the eyeglass lens L. The outer end of the spindle 22 extends through a hole 79 in the central portion of the crosswall of the cup-shaped nut 74 and is provided with a hand wheel 80 whereby the spindle may be manually turned as described hereafter. The spindle 22 is not only rotatable but also slidable axially inwards and outwards in order to bring the chuck 78 into and out of gripping relation with the adjacent side of the lens L. A spiral compression spring 81 urges the spindle 22 inwards so as to maintain the chuck 78 in gripping relation with the lens L, and a pinion 82 and a tubular rack member 83 serve as means whereby the spindle 22 may be retracted or slid outwards against the force of the spring 81 into a position wherein the chuck 78 is released from the adjacent side of the lens. The spring 81 surrounds the outer end portion of the spindle 22 and is arranged so that the outer end thereof abuts against the inner surface of the crosswall of the cup-shaped nuts 74. The inner end of the spring 81 abuts against a collar 84 which is fixedly connected to the outer end portion of the spindle 22 and fits slidably in the outer end of the sleeve-like bearing 73. The pinion 82 is disposed within a chamber 85 in an integral enlargement 86 on the lower inner portion of the tubular extension 72 and is fixedly connected to a horizontal stub shaft 87 which extends transversely of the head 21 and projects through, and is journalled in, holes in the sides of the enlargement 86. The front end of the stub shaft 87 is provided with a radially extending arm 88 whereby the stub shaft and pinion may be turned or rotated. As shown in Figures 3 and 12 the upper portion of the pinion 82 extends through a slot 89 in the lower central portion of the sleeve-like bearing 73. The tubular rack member 83 extends loosely around the outer end portion of the spindle 22 and overlies the pinion 82. The lower portion of the rack member meshes with the upper portion of the pinion 82 and the outer end of the rack member abuts against the collar 84. The inner end of the rack member 83 abuts against a collar 90 which is disposed inwards of the collar 84 and is pinned or otherwise fixedly secured to the adjacent portion of the spindle 22. When the pinion 82 is rotated in a clockwise direction by way of the arm 88 as viewed in Figures 1, 3 and 12, it operates through the medium of the tubular rack member 83 to slide the spindle 22 outwards into its retracted position wherein the chuck 78 is out of gripping relation with the lens L. When the arm 88 is released the spiral compression spring 81 serves to slide the spindle inwards into its operative position wherein the chuck 78 is in its operative or lens gripping position.

The spindle 23 is located at the upper left hand corner of the head 21 and is arranged so that the inner end portion thereof is journalled in the sleeve-like bearing 60, its central portion extends through the circular opening 77 in the end member 53 of the head and its outer end portion extends through a circular hole 91 in the outer upper portion of said end member 53. The inner end of the spindle 23 extends into the open sided space 61 and is provided with a fixed chuck 92 which is in opposed relation with the chuck 78 on the inner end of the spindle 22 and is adapted to grip the left hand side of the eyeglass lens L. The central portion of the spindle 23 is journalled in a ball bearing 93, the inner race of which is fixedly secured to the adjacent portion of the spindle and the outer race of which fits snugly within the circular opening 77 in the upper portion of the end member 53 of the head 21. The ball bearing 93 serves to hold the spindle 23 against axial displacement.

The two chucks 78 and 92 are adapted to clamp the eyeglass lens L between them. They are also adapted when the head 21 is swung inwards into its operative position wherein the edge of the lens L is in contact with the grinding surface 41 of the grinding wheel 39 to turn or rotate together in response to operation of the motor driven gearing 24 in order to rotate the lens so that all portions of the edge thereof are ground by the grinding surface.

Associated with the head is an upstanding toggle linkage 94 which serves yieldingly to hold the head in its operative position and also to retain the head when it is swung laterally away from the grinding wheel 39 into its inoperative position at the conclusion of an edge grinding operation. Such linkage is located in front of the spindle carrying head 21 as best shown in Figure 6 and comprises a lower spring variety compound link 95 and an upper rigid link 96. The lower link 95 comprises a hollow cylinder 97, a tubular sleeve 98, a rod 99, a spiral compression spring 100 and a cup shaped member 101. The hollow cylinder 97 extends upwards and is provided at its lower end with an end wall 102 which is secured in place by screws 103 and embodies an integral, depending lug 104. Such lug is disposed between the outer ends of the side parts of a substantially horizontal U-shaped bracket 105 and is pivotally connected to said side parts by way of a horizontal pivot pin 106 which extends through aligned holes in the lug 104 and the outer ends of the side parts of the bracket. The cross part of the bracket 105 fits against the lower left hand end of the carriage 20 and is secured thereto by way of bolts 107. The pivot pin 106 extends lengthwise of the carriage and the head and permits the lower link 95 to swing towards and away from the grinding wheel 39. The upper end of the hollow cylinder 97 is provided with an integral inwardly extending annular flange 108. The tubular member 98 is disposed above, and in coaxial relation with, the hollow cylinder 97 and is provided at its upper end with a centrally apertured plug 109. The lower end of the tubular member 98 fits within the inwardly extending annular flange 108 and is secured thereto by a screw thread connection 110. The rod 99 of the lower link 95 is of greater length than the combined length of the hollow cylinder 97 and the tubular member 98 and extends slidably through the aperture in the central portion of the plug 109. The upper end of the rod 99 is provided with an eye 111 and the central portion of said rod is provided with a collar 112. Such collar is secured to the rod 99 by a screw thread connection 113, is slidably mounted in the tubular member 98, and coacts with the plug 109 to limit upward sliding movement of the rod 99 relatively to the hollow cylinder 97 and the tubular member 98. The lower end of the rod coacts with the end wall 102 to limit downward sliding movement of said rod. The spiral compression spring 100 of the lower link 95 surrounds the lower end portion of the rod 99 and has the upper portion thereof disposed in the tubular member 98 and its lower portion disposed within the hollow cylinder 97. The upper end of the spring 100 abuts against the lower end of the collar 112. The cup shaped member 101 is mounted slidably within the hollow cylinder 97 and is arranged so that its crosswall is disposed at the bottom. The central portion of the crosswall of the cup-shaped member 101 is provided with a central aperture 114 through which the lower end of the rod 99 extends slidably. The lower end of the spring 100 abuts against the upper surface of the crosswall of the cup-shaped member 101. The position of the cup-shaped member 101 with respect to the hollow cylinder 97 determines the loading of the spiral compression spring 100. When the cup-shaped member 101 is slid upwards relatively to the hollow cylinder it increases the loading of the spring and when it is slid downwards it results in decreasing the loading of the spring. A pinion 115 and a series of rack teeth 116 serve to slide the cup-shaped member 101 upwards and downwards in order to vary the loading of the spring. The rack teeth 116 are formed on the outer surface of the continuous side wall of the cup-shaped member 101. They extend lengthwise of the member and are in alignment with a longitudinal slot 117 in the hollow cylinder 97. The pinion 115 is positioned alongside of the hollow cylinder 97 and is arranged so that one portion thereof extends through the slot 117 and meshes with the rack teeth 116. It is fixedly secured to the inner end of a stub shaft 118 which is disposed transversely of the carriage 20 and the spindle carrying head 21 and extends through, and is journalled in, a hole in the central portion of a substantially circular flat plate-like member 119. A radially extending arm 120 is fixedly connected to the outer or front end of the shaft 118. When the arm is swung in a clockwise direction as viewed in Figure 1 it operates through the medium of the shaft 118, the pinion 115 and rack teeth 116 to slide the cup-shaped member 101 upwards, thereby resulting in an increased loading of the spiral compression spring 100. When the arm 120 is turned in the reverse direction it operates through the medium of the aforementioned parts or elements to slide the cup-shaped member 101 downwards in the hollow cylinder 97, thereby resulting in a decrease in the loading of the spring 100. The outer end of the arm 120 is provided with an outwardly extending knob 121 in order that the arm may be readily turned or swung when it is desired to increase or decrease loading of the spring 100. A conventional spring biased ball-type detent (not shown) is suitably mounted in a socket (also not shown) in the inner end portion of the knob and coacts with an arcuate series of recesses 122 in the marginal portion of the plate-like member 119 releasably to hold the arm 120 in the various positions into which it is manually swung by the operator of the apparatus. The plate-like member 119 is preferably formed as an integral part of the hollow cylinder 97. The upper rigid link 96 of the toggle linkags 94 directly overlies the compound link 95 and extends upwards as shown in Figures 1 and 6. The lower end of the upper link 96 is bifurcated and straddles the eye 111 on the upper end of the rod 99. It is pivotally connected to the upper end of the compound link 95 by way of a horizontal pivot pin 123 which extends through the eye 111 and aligned holes in the furcations of the bifurcated lower end of the upper link 96. The upper end of the upper link 96 is bifurcated and straddles an outwardly extending lug 124 on a bracket 125. It is pivotally connected to the lug by way of a horizontal pivot pin 126 which extends through aligned holes in the lug and the furcations of the bifurcated upper end of the upper link 96. The bracket 125 is connected to the upper left hand corner of the main member 51 of the head 21 by way of screws 127. When the two links are shifted inwards past dead center they serve yieldingly to hold the head 21 in its operative position wherein the chuck held lens L is in engagement or contact with the grinding surface 41 of the grinding wheel 39. When the links of the toggle linkage are shifted outwards beyond dead center they serve to hold the head in its inoperative position wherein the lens is out of engagement with the grinding wheel of the assembly 19. When the head is in its operative position the spiral compression spring 100 permits the head to swing laterally to a limited extent. By adjusting or varying the loading of the spring as hereinbefore described, the pressure under which the chuck held lens L engages the grinding surface of the grinding wheel 39 when the head is in its operative position may be increased or decreased as desired. An inverted L-shaped lever 128 is connected to the central portion of the rigid upper link 96 of the toggle linkags 94 and serves as a medium whereby the two links may be swung inwards or outwards past dead center. The lower end of the lever is provided with a knob 129 whereby the lever may be readily gripped by the operator of the apparatus. When the lever is swung inwards as viewed in Figure 6 the links 95 and 96 are swung inwards past dead center and, as previously pointed out, serve yieldingly to hold the head 21 in its operative position. Outward shift or swinging of the lever 128 causes the two links of the toggle linkage to swing outwards past dead center and results in the head being swung away from the grinding wheel into its inoperative position.

*Motor driven gearing for driving the spindles*

The motor driven gearing 24 is mounted entirely on the head 21 and serves when actuated while the head is in its operative position, conjointly to drive the spindles 22 and 23 so that they turn or rotate the chuck held lens L relatively to the grinding wheel 39. It is controlled by the template 26 as hereinafer described and consists of an elecric motor 130; a gear train in the form of a pinion 131, a spur gear 132, a pinion 133, a spur gear 134, a worm 135, and a worm gear 136; a shaft 137; a clutch 138 between the worm gear 136 and the shaft 137; a gear train between the shaft 137 and the spindle 22 and in the form of a spur gear 139, an idler spur gear 140 and a driven spur gear 141; and a gear train between the shaft 137 and the spindle 23 and in the form of a spur gear 142, an idler spur gear 143 and a driven spur gear 144.

The electric motor 130 is mounted on the lower front portion of the head 21 and comprises a casing 145 and an armature shaft 146. As shown in Figure 11, the motor extends transversely of the head and has the inner portion of its casing 145 disposed within an annular flange 147 which is an integral part of the main member 51 of the head 21. The rear end of the armature shaft 146 of the motor extends through a circular opening 148 and into the lower portion of the gear compartment 55.

The gear train in the form of the pinion 131, the spur gear 132, the pinion 133, the spur gear 134, the worm 135 and the worm gear 136 is disposed within the gear compartment 55. The pinion 131 is keyed or otherwise fixedly secured to the rear end of the armature shaft 146 of the electric motor 130 and meshes with, and serves to drive, the spur gear 132. The latter is keyed or otherwise fixedly secured to a stub shaft 149, one end of which is journalled in a bearing 150 on the plate 66. The pinion 133 is fixedly secured to the stub shaft 149 and meshes with, and serves to drive, the spur gear 134. The latter is keyed or otherwise fixedly secured to one end of a shaft 151, one end of which is journalled in a bearing 152 on the plate 66. The other end of the shaft 151 is journalled in a bearing 153 which fits within a circular hole 154 in the main member 51 of the head 21 and is connected at its outer end to a plate 155. Such plate is removably secured in place by way of screws 156 which extend through the plate and into screw threaded sockets in the portion of the main head member 51 that defines the circular opening 154. The worm 135 is formed on the central portion of the shaft 151 and meshes with, and serves to drive, the worm gear 136. The latter is disposed in the upper end portion of the gear compartment 55 which, as previously pointed out, communicates with the right hand end of the shaft compartment 56 and the lower end of the gear compartment 57.

The shaft 137 of the motor driven gearing 24 extends horizontally and is disposed within, and projects longitudinally through the shaft compartment 56 in the main member 51 of the head 21. The right hand end of the shaft 137, as viewed in Figure 12, has a longitudinal bore 157 and extends through the upper portion of the gear compartment 55 and the lower end of the gear compartment 57. A ball bearing 158 in the inner end of the tubular extension 71 of the head end member 52 serves rotatably to support the right hand end of the shaft 137. The left hand end of such shaft extends through the lower end of the gear compartment 58 and is journalled in a bearing 159 in the lower end of the head end member 53. The worm gear 136 extends loosely around the right hand end of the shaft 137 as best shown in Figure 12 of the drawings.

The clutch 138 is disposed within the upper portion of the gear compartment 55 and comprises a pair of tubular, coacting clutch parts 160 and 161. The clutch part 160 extends loosely around the right hand end of the shaft 137 and is suitably confined or held against axial displacement. It is located outwards of the clutch part 161 and embodies an annular series of clutch teeth 162 at its inner end. The worm gear 136 surrounds the outer end of the clutch part 160 and is fixedly secured thereto by way of a key 163. The clutch part 161 extends around, and is slidably mounted on, the right hand end of the shaft 137 and is provided at its outer end (right hand end as viewed in Figure 12) with an annular series of teeth 164 which when the clutch part 161 is shifted towards the clutch part 160, interfit with the teeth 162 and form a driving connection whereby the clutch part 161 is driven by the clutch part 160. A crosspin 165 serves to limit axial sliding movement of the clutch part 161 with respect to the shaft 137 and also to connect the shaft for drive by the clutch part 161 when the two clutch parts are in their operative or clutched position. The central portion of the crosspin extends across the inner end of the bore 157 in the right hand end of the shaft 137 and the ends of the pin extend through longitudinally extending diametrically opposite slots 166 in the right hand end of the shaft 137 and fit snugly within diametrically opposite holes 167 in the inner end of the clutch part 161. When such clutch part is slid axially away from the clutch part 160 the shaft 137 is released so that it is free to turn relatively to the worm gear 136. A spiral compression spring 168 urges the clutch part 161 into its clutched position with respect to the clutch part 160. Such spring is disposed in the inner end of the bore 157 and has one end thereof in abutment with the central portion of the crosspin 165. The clutch part 161 of the clutch 138 is slid axially anwards against the force of the spring 168 by way of a horizontal rod 169 and an externally threaded tubular member 170. The inner portion of the rod 169 is slidably mounted in the outer portion of the bore 157. The outer portion of the rod is disposed within the tubular extension 71 on the lower end of the head end member 52. As shown in Figure 12, the inner end of the rod 169 abuts against the central portion of the crosspin 165. The externally threaded tubular part 170 fits rotatably within the outer end of the tubular extension 71 and surrounds the outer end of the rod 169. It has associated with it a pair of diametrically opposite screws 171 and embodies in its outer end a longitudinally extending adjusting screw 172, the inner end of which is in abutment with the outer extremity of the rod 169. The screws 171 extend through screw threaded holes 173 in the outer end of the tubular extension 71 and have at the outer ends thereof lock nuts 174 for locking them in place. The inner ends of the screws 171 are tapered and fit within the external screw thread on the tubular member 170. When such tubular member is turned in one direction it feeds inwards and operates through the medium of the rod 169 to slide the clutch part 161 inwards into its de-clutched position with respect to the clutch part 160. When the tubular member 170 is turned reversely it feeds outwards and permits the spiral compression spring 168 to slide the clutch part 161 outwards into clutched relation with the clutch part 160. Turning of the externally threaded tubular member 170 for clutch control purposes is effected by way of an L-shaped lever 175 consisting of a long arm 176 and a short arm 177. The adjoining inner ends of the two arms are provided with a hole 178 into which fits a reduced extension 179 on the outer end of the tubular member 170. A nut 180 on the adjusting screw 172 serves to clamp the hole defining portion of the lever 176 against an annular shoulder at the inner end of the reduced extension 179 to the end that the lever is secured fixedly to the externally threaded tubular member 170. The external screw thread on such tubular member is so arranged and designed that when the member is turned by the lever 175 in a counterclockwise direction as viewed in Figure 5 the slidably mounted clutch part 161 is slid into its inoperative or de-clutched position. The short arm 177 of the lever 175 extends at right angles to the long arm 176. The L-shaped lever 175 is so connected to the tubular member 170 that when the head is in its operative position and the slidably mounted clutch part 161 of the clutch 138 is in clutched relation with the clutch part 160 the long arm 176 extends forwards and upwards and the short arm 177 extends forwards and downwards as shown in Figure 5. The long arm 176 is shaped to form a handle whereby the L-shaped lever 175 may be gripped when it is desired manually to turn the tubular member 170 for clutch controlling purposes. The outer end of the short arm 177 is provided with a fixedly transversely extending pin 181. Associated with the L-shaped lever 175 are a vertically extending plate 182, a block 183, a vertically elongated stop member 184, a substantially horizontally extending latch bar 185 and a vertically slidable plunger 186. The plate 182 underlies the L-shaped lever 175 and has the lower end thereof in abutment with the upper portion of the right hand end wall 45 of the carriage 20. It is fixedly secured to the carriage by way of bolts 187 which extend through holes in the lower corners of the plate 182 into screw threaded sockets in the upper portion of the right hand end wall 45. The block 183 is vertically elongated and has bolts 188 whereby it is fixedly secured to the outer face of the front central portion of the plate 182. The vertically elongated stop member 184 is connected at its lower end to the upper end of the block 183 and has at its upper end a rearwardly extending right angle enlargement 189, the lower portion of which defines a downwardly facing stop shoulder 190. The horizontally extending latch bar 185 is disposed adjacent the upper end of the plate 182 and directly beneath the transverse pin 181 on the outer end of the short arm 177 of the lever 175. A screw 191 extends loosely through a hole in the rear or inner end of the latch bar 185 into a screw threaded socket in the upper rear corner of the plate 182 and serves to support the latch bar so that it is capable of swinging upwards and downwards in a vertical plane. The upper front corner of the latch bar 185 is cut away to form a pin receiving notch 192 and an underlying finger 193. The finger coacts with the downwardly facing stop shoulder 190 to limit upward swinging movement of the latch bar 185. The plunger 186 is located directly behind the stop member 184 and has the upper end thereof in abutment with the front end of the latch bar 185. The lower end of the plunger 186 is slidably mounted in a vertically extending bore 194 in the block 183. A spiral compression spring 195 is located in the lower end of the bore 194 and serves to urge the plunger 186 upwards so that it yieldingly maintains the latch bar 185 in its up position as determined by the finger 193 and the downwardly facing stop shoulder 190. When the head 21 is in its operative position as shown in full lines in Figure 5, the pin 181 rests on the upper surface of the front end of the latch bar 185. If it is desired manually to effect de-clutching of the clutch 138 while the head is in its operative position so as to permit manual turning of the chuck carrying spindles 22 and 23 the L-shaped lever 175 is turned in a counterclockwise direction as shown in dotted lines in Figure 5. In connection with counterclockwise turning of the lever 175 the pin 181 first slides rearwards on the upper surface of the latch bar 185 and at the same time depresses the latch bar. As soon as the short arm 177 of the lever 175 swings rearwards past dead center the plunger 186 urges the latch bar upwards and causes it by way of a camming action on the pin 181 to complete clockwise turning of the lever 175 with a snap or spring action. After the short arm 177 is swung rearwards past dead center the latch bar 185 serves yieldingly to hold the L-shaped lever 175 in the position which it assumes when it operates through the medium of the tubular member 170 and the rod 169 to hold the slidable clutch part 161 in its de-clutched position. When the head 21 is initially swung forwards into its inoperative position the pin 181 on the outer end of the short arm 177 of the L-shaped lever 175 moves into the notch 192 and is confined in the latter. Further forward swinging movement of the head into its inoperative position causes counterclockwise turning of the lever 175, thus resulting in automatic de-clutching of the clutch 138. When the head 21 is swung inwards into its operative position the pin 181 coacts with the notch 192 to turn the lever 175 in a clockwise direction as viewed in Figure 5 thereby causing the slidably mounted clutch part 161 to slide forwards into clutched relation with the clutch part 160. The lever 176 together with the stop member 184, the latch bar 185 and the spring loaded plunger 186 constitutes manual means whereby the clutch parts 160 and 161 may be brought into declutched or clutched position when the head is in its operative position and also means whereby the clutch parts are automatically de-clutched when the head is swung inwards into its inoperative position and brought into clutch relation when the head is swung rearwards into its operative position.

The gear train consisting of the spur gear 139, the idler spur gear 140 and the spur gear 141 is disposed in the gear compartment 57 and serves to drive the spindle 22 from the shaft 137. The spur gear 139 is mounted on, and keyed to, the right hand end of the shaft 137 as viewed in Figures 3 and 12 and is disposed directly inwards of the ball bearing 158. The idler spur gear 140 is disposed in the central portion of the gear compartment 57 and meshes with, and is driven by, the spur gear 139. It is rotatably mounted on a horizontal stub shaft 196, one end of which extends into a socket in the head end member 52 and the other end of which extends through the upper right hand corner of the main member 51 of the head. The spur gear 141 is disposed in the upper end of the gear compartment 57 and meshes with and is driven by the idler spur gear 140. It surrounds the central portion of the spindle 22 and has a key and groove connection 197 between it and the spindle whereby it is connected to drive the spindle while at the same time the spindle is permitted to slide axially relatively to the spur gear 141. The gear train consisting of the spur gear 142, the idler spur gear 143 and the spur gear 144 is disposed within the gear compartment 58 and serves to drive the spindle 23 from the shaft 137. The spur gear 142 is keyed or otherwise fixedly secured to the left hand end of the shaft 137 and is disposed in the gear compartment 58 directly inwards of the bearing 159. The idler spur gear 143 is disposed in the central portion of the gear compartment 58 and meshes with and is driven by the spur gear 142. It is rotatably mounted on a horizontal stub shaft 198, one end of which fits within a bearing in the inner central portion of the end member 53 of the head 21 and the other end of which extends through the upper left hand corner of the main member 51 of the head. The spur gear 144 meshes with, and is driven by the idler spur gear 143. It is disposed in the upper end of the gear compartment 58 and extends around and is suitably fixedly secured to the central portion of the spindle 23.

The electric motor 130 is controlled as hereinafter described by a micro-switch 199. When the switch is closed while the clutch 138 is in its operative or clutched position the motor 130 operates through the gearing 24 conjointly to drive the spindles 22 and 23 to the end that they effect rotation of the chuck-held lens L relatively to the grinding surface 41 of the grinding wheel 39. When the clutch parts 160 and 161 of the clutch 138 are in their de-clutched position the spindles 22 and 23 are released so that they may be turned manually by the knurled hand wheel 80 on the spindle 22.

*Motor actuated mechanism for reciprocating the carriage*

The mechanism 25 serves in connection with a lens edge grinding operation to reciprocate or slide back and forth the carriage 20 in order to cause the lens to traverse the grinding surface 41 of the grinding wheel 39. It is mounted for the most part directly under the top member 28 of the supporting structure 18 and comprises an electric motor 200, a worm 201, a worm gear 202, a shaft 203, a tubular externally threaded member 204, a tooth equipped follower 205, a slide rod 206, a split collar 207, a centrally fulcrumed lever 208, a link 209, a screw shaft 210, and a hand wheel 211.

The electric motor 200 is located beneath the central portion of the elevated rear portion 36 of the top wall of the top member 28. It comprises a cylindrical casing 212 and an armature shaft 213 and is positioned or arranged so that the armature shaft extends horizontally and also transversely of the carriage and head. Directly in front of the casing 212 of the motor 200 is a horizontal longitudinally extending housing 214 which consists of a cylindrical side wall 215, an inner end wall 216 and an outer end wall 217. The front end of the casing 212 of the motor 200 is suitably attached to the inner end of the cylindrical side wall 215 of the housing 214. As shown in Figures 2 and 15, the side portions of such wide wall are provided with integral outwardly extending lugs 218. The motor 200 and the housing 214 are suspended from above by way of vertically extending hanger posts 219, the upper ends of which are suitably secured to the elevated rear portion 36 of the top wall of the top member 28 and the lower ends of which are connected by bolts 220 to the lugs 218. The inner end wall 216 of the housing 214 fits against the inner end of the housing side wall 215 and is removably secured in place by way of screws 221 which extend through the marginal portion of the inner end wall 216 into screw threaded sockets in the inner end of the housing side wall. The outer end wall 217 of the housing 214 fits against an inwardly extending annular flange 222 on the outer end of the housing side wall and is removably secured in place by way of screws 223 which extend through holes in the outer margin of the outer end wall and screw threaded holes in the flange 222. The front end of the armature shaft 213 of the motor 200 is extended and projects through the inner end of the housing side wall 215 into the inner end portion of the interior of the housing.

The worm 201 of the carriage reciprocating mechanism 25 is disposed in the inner end portion of the interior of said housing 214 and is keyed or otherwise fixedly secured to the front end of the armature shaft 213 of the electric motor 200. It extends transversely of the housing 214 and meshes with, and serves to drive, the worm gear 202. The shaft 203 extends horizontally and is centrally disposed in the inner end portion of the interior of the housing 214. The right hand end of the shaft 203 is journalled in a ball bearing 224 which is mounted in an inwardly extending annular flange 225 on the central portion of the inner end wall 216. The central portion of the shaft 203 is journalled in a ball bearing 226, the outer race of which is suitably secured within a central circular hole in the crosswall of a cup-shaped bearing retainer 227. The worm gear 202 is fixedly secured to the portion of the shaft 203 that is between the bearings 224 and 226. The tubular member 204 of the carriage reciprocating mechanism 25 is disposed in the central portion of the interior of the housing 214 and extends around the left hand end of the shaft 203. Said tubular member 204 is drivably connected to the shaft 203 by way of a longitudinally extending key 228 and has the outer periphery thereof shaped to form a left hand screw thread 229 and an intersecting right hand screw thread 230. When current is supplied to the electric motor 200 the armature shaft 213 of the motor operates through the medium of the worm 201, the worm gear 202 and the shaft 203 to drive or rotate the tubular member 204 at a comparatively low speed.

The follower 205 is L-shaped. It is disposed in the outer end portion of the interior of the housing 214 and consists of a horizontally extending leg 231 and a vertically extending leg 232. The horizontally extending leg is disposed adjacent the top portion of the housing side wall 215 and embodies at its inner end a depending arcuate tooth 233 which is mounted by way of an upstanding pin 234 to rock about a vertical axis and is arranged so that it is alternately disposed in the left and right hand screw threads 229 and 230 in the outer peripheral portion of the tubular member 204. The pin 234 is mounted rotatably in a vertically extending hole 235 in the inner end of the horizontal leg 231 of the follower 205. The vertically extending leg 232 is connected to, and depends from, the outer end of the horizontally extending leg 231 and is provided at its lower end with a transverse circular hole 236. In connection with drive or rotation of the tubular member 204 the tooth 233 moves from left to right in one of the screw threads and then from right to left in the other screw thread. This movement on the part of the tooth 233 causes the follower 205 to be moved back and forth lengthwise of the housing 214. The follower 205 is held against lateral displacement by way of an upstanding roller 237 which is mounted on the outer end of the horizontally extending leg 231 and in connection with back and forth movement of the follower travels in a longitudinally extending slot 238 in the upper portion of the housing side wall 215. As shown in Figure 16, the upper portion of the slot is closed by a plate 239 which is removably secured in place by way of screws 240. Disposed exteriorly of the outer end wall 217 of the housing 214 is a U-shaped bracket 241 which consists of a crosspiece 242, a tubular inner side piece 243, and a tubular outer side piece 244. The crosspiece 242 of the bracket 241 extends between, and serves to connect, the inner and outer tubular side pieces and extends substantially vertically. The inner tubular side piece 243 projects forwards from the inner end of the crosspiece 242 and is formed integrally with the central portion of the outer end wall 217 of the housing 214. It has mounted therein a sleeve-like bearing 245 and this, as shown in Figures 15 and 16, is disposed in coaxial relation with the circular hole 236 in the lower end of the vertically extending leg 232 of the follower 205. The outer tubular side piece 244 of the bracket 241 projects forwards from the outer end of the crosspiece 242 and has mounted therein a sleeve-like bearing 246 which is in axial alignment with the bearing 245 and has the same internal diameter as the bearing 245. The slide rod 206 of the carriage reciprocating mechanism 25 extends horizontally and has the end portions thereof mounted for longitudinal sliding movement in the sleeve-like bearings 245 and 246 in the side pieces of the U-shaped bracket 241. The inner end of the slide rod 206 is provided with a reduced stem 247 which fits snugly within the hole 236 in the lower end of the vertically extending leg 232 of the follower 205 and is provided at its inner end with a clamp bolt 248 for securing it in place. When the follower 205 is shifted back and forth in the housing 214 in connection with drive or rotation of the tubular externally threaded member 204 the rod 206 moves or slides conjointly with the follower.

The clevis 207 is mounted on the central portion of the slide rod 206. It is clamped therearound by way of a transverse screw 249 which extends transversely through screw threaded holes in the free ends of the collar. At the side thereof that is opposite the crosspiece 242 of the U-shaped bracket 41 the split collar 207 is provided with a pair of outwardly extending laterally spaced ears 250. The lever 208 is positioned horizontally and extends forwards from the split collar 207. Said lever 208 is disposed for the most part beneath the low front portion 35 of the top wall of the top member 28 and has a longitudinal slot 251 in its central portion. The rear end of the lever 208 extends between the outwardly extending laterally spaced ears 250 on the split collar 207 and is pivotally connected thereto by way of a vertically extending pivot element 252 which extends through aligned holes in the ears 250 and the rear end of the lever 208. A roller 253 (see Figures 4 and 14) is disposed within the longitudinally extending slot 251 in the central portion of the lever 208 and forms a central fulcrum for the lever. This roller is supported as hereinafter described, and is laterally shiftable so that its position with respect to the central portion of the lever may be varied or adjusted. When the electric motor 200 is in operation it operates through the medium of the worm 201, the worm gear 202, the shaft 203, the tubular member 204, the tooth equipped follower 205, the slide rod 206 and the split collar 207 to swing or rock the lever 208 back and forth about the fulcrum forming roller 253.

The link 209 of the carriage reciprocating mechanism 25 is disposed horizontally and underlies the central portion of the low front portion 35 of the top wall of the top member 28. It extends lengthwise of the carriage 20 and has its left hand end as viewed in Figure 3 bifurcated. The furcations of the bifurcated left hand end of the link 209 are arranged in straddled relation with the front end of the central fulcrumed lever 208 and are pivotally connected to the latter by way of a vertically extending pivot pin 254 which extends through aligned holes in said furcations and the front end of the lever. The inner or right hand end of the link 209 is surmounted by a block 255 which is pivotally connected to the link by way of a vertically extending pivot element 256. The latter, as shown in Figure 3, extends through a hole in the inner or right hand end of the link 209 and has an externally threaded upper end which fits within a screw-threaded socket in the lower portion of the block 255. The screw shaft 210 is disposed directly beneath the low front portion 35 of the top wall of the top member 28 and extends lengthwise of the carriage 20. The left hand end of the screw shaft 210 as viewed in Figure 3 extends loosely through a horizontal hole 257 in the upper portion of the block 255 and has mounted thereon a pair of set screw equipped collars 258 which are disposed in straddled relation with the block 255 and serve so to connect the inner or left hand end of the screw shaft 210 to said block that said screw shaft moves back and forth with the block while at the same time it is free to turn relatively to the block 255 without axial displacement relatively thereto. The central portion of the screw shaft 210 extends through and is in threaded engagement with a transverse screw threaded hole in the vertical depending part of a T-shaped bracket 259. The cross part of the bracket 259 fits against the integral depending lug 46 on the central portion of the horizontally extending wall 44 of the carriage 20 and is fixedly secured thereto by way of bolts 260. As shown in Figure 3, the depending vertically extending part of the bracket 259 extends downwards through, and is mounted for longitudinal sliding movement in, the slot 47 in the central portion of the low front portion 35 of the top wall of the top member 28. When the lever 208 is rocked or turned back and forth as hereinbefore described it operates through the medium of the link 209, the block 255, the screw shaft 210 and the T-shaped bracket 259 to reciprocate or slide back and forth the carriage 20, thus causing the chuck held lens L to traverse the grinding surface 41 of the grinding wheel 39.

The outer or right hand end of the screw shaft 210 fits slidably in a horizontally extending tubular member 261, the outer end of which extends through the front end portion of the right hand side wall of the top member 28 and is connected to the central portion of the hand wheel 211. A collar arrangement 262 is associated with the outer end of the tubular member 261 and permits the tubular member 261 to turn with the hand wheel 211 while at the same time said collar arrangement holds the tubular member 261 against axial displacement. The outer or right hand end of the screw shaft 210 is provided with a fixed radially extending pin 263 which extends transversely through, and is slidable lengthwise in, a longitudinally extending slot 264 in the inner end portion of the tubular member 261. The pin 263 and the slot 264 form a connection between the tubular member 261 and the outer or right hand end of the screw shaft 210 whereby the screw shaft is caused to turn with the tubular member 261 while at the same time it is permitted to slide lengthwise relatively thereto. When the screw shaft 210 is turned in one direction by turning of the hand wheel 211 the T-shaped bracket 259 together with the carriage 20 and the head 21 are displaced or shifted to the left relatively to the screw shaft with the result that the traverse position of the chuck held lens L with respect to the grinding surface 41 of the grinding wheel 39 is changed. When the screw shaft 210 is turned in the opposite direction by turning of the hand wheel 211 it displaces or shifts the T-shaped bracket 259 together with the carriage 20 and the head 21 to the right relatively to the screw shaft, thereby further changing the traverse position of the lens L with respect to the frustoconical grinding surface 41. Two pairs of spaced apart nuts 265 are mounted on the central portion of the screw shaft 210 and serve to limit the amount of lateral adjustment of the carriage relatively to the screw shaft.

The fulcrum forming roller 253 is rotatably mounted on the lower end of a vertically extending pivot pin 266 and, as shown in Figure 4, is held against downward displacement with respect to the pivot pin by way of a bolt 267. The upper end of the pivot pin 266 is suitably fixedly connected to a horizontally elongated slide block 268 which is confined between a pair of parallel spaced apart guide bars 269 to slide forwards and rearwards, i. e., towards and away from the front wall of the top member 28 of the supporting structure. The guide bars 269 are connected by vertically extending bolts to the low front portion 35 of the top wall of the top member 28. When the slide block 268 is shifted forwards the fulcrum forming roller 253 is shifted forwards with respect to the lever 208 with the result that the length of the back and forth stroke of the carriage 20 is decreased. Rearward shift or sliding movement of the slide block 268 causes the fulcrum forming roller 253 to move rearwards with respect to the lever 208 and results in increase of the length of the back and forth stroke which is imparted to the carriage in connection with actuation of the mechanism 25. The block 268 is slid by way of a horizontally extending screw shaft 270 which is disposed beneath the low front portion 35 of the top wall of the top member 28 extends transversely of the carriage and head. The rear end of the screw shaft 270 extends through a screw threaded hole in the slide block 268 and the rear end of the screw shaft extends through a hole in the front wall of the top member 28 and is provided at its extremity with a hand wheel 271 for turning purposes. Two spaced apart collars 272 are mounted on the front end of the screw shaft 270 in straddled relation with the front wall of the top member 28 and serve to hold the screw shaft against axial displacement while at the same time permitting it to turn or rotate. The hand wheel 271, the screw shaft 270 and the slide block 268 constitute means whereby the fulcrum forming roller 253 may be shifted forwards or rearwards with respect to the lever 208 in order to decrease or increase the back and forth stroke that is imparted to the carriage 20 in connection with operation of the motor actuated mechanism 25.

*Template*

The template 26 is in the form of a plate and is shaped conformably to the desired contour for the lens L. It coacts or works in conjunction with a vertically extending anvil 273 and is mounted on the outer end of the spindle 23. Such end of the spindle is provided with a reduced screw threaded stem 274 and has between it and the inner end of the stem a flat annular shoulder 275. A set screw equipped collar 276 is fixed to the inner end of the stem 274 and abuts against the shoulder 275. The central portion of the template 26 is provided with a hole for the screw threaded stem 274 and is releasably clamped against the outer end face of the collar 276 by way of a knurled nut 277 on the outer end of the stem. When the nut is tightened the template 26 is so clamped that it is in fixed relation with the spindle 23 and hence rotates with the latter. When the knurled nut 277 is removed from the screw threaded stem 274 the template may be removed so that a template having a different contour may be substituted for it. The anvil 273 is positioned directly behind the template 26 and is mounted on a bell crank 278, as best shown in Figure 4 of the drawings. The bell crank consists of a substantially vertical arm 279 and a substantially horizontal arm 280. The horizontal arm is connected to, and projects forwards from, the lower end of the vertical arm 279. The anvil 273 is located in front of the upper end of the arm 279 and is secured thereto by horizontal cap screws 281. A horizontal pivot pin 282 extends through the connected ends of the arms 279 and 280 and serves to support the bell crank so that it is capable of swinging back and forth in a vertical plane at right angles to the carriage 20 and the head 21. Said pivot pin 282 is located in, and extends across, the upper rear corner portion of the interior of a horizontally elongated housing 283. The latter extends transversely of the head 21 and is located directly beneath the template 26. It comprises a bottom wall 284, a front wall 285, a top wall 286, a back wall 287 and an inner side wall 288. A separately formed plate 289 serves as the outer side wall of the housing 283 and is removably secured in place in order that upon removal thereof access may be had to the interior of the housing. The inner end of the horizontal pivot pin 282 is suitably secured to the upper rear corner of the inner side wall 288 of the housing 283. The rear portion of the housing top wall 286 is provided with a cutout 290 through which the substantially vertical arm 279 of the bell crank projects. The substantially horizontal arm 280 of the bell crank underlies the front portion of the housing top wall 286. The micro-switch 199 for controlling the motor 130 is mounted within the housing 283 directly beneath the substantially horizontal arm 280 of the bell crank 278 and embodies at its upper front corner a vertically slidable spring loaded button 291. The latter underlies the outer or distal end of the bell crank arm 280 and is so arranged that when it is depressed against the force of its spring the micro-switch 199 is opened and when it is slid upwards by its spring the micro-switch is closed. The outer or distal end of the bell crank arm 280 is provided with a vertically adjustable depending pin 292 which overlies and engages the spring loaded button 291. When the bell crank 278 turns in a clockwise direction as viewed in Figure 4 the pin 292 depresses the button 291 and results in opening of the micro-switch 199. When the bell crank 278 turns or swings in a counterclockwise direction the pin 292 swings upwards and so releases the button 291 as to effect closing of the switch 199. Counterclockwise turning of the bell crank 278 occurs when the template 26 engages the anvil 273. A spiral compression spring 293 is interposed between the central portion of the bell crank arm 280 and the superjacent portion of the top wall 286 of the housing 283 and serves to urge the bell crank 278 in a clockwise direction as viewed in Figure 4. The upper end of the spring 293 extends around, and is held against lateral displacement by, the lower end of a vertically extending screw 294 which extends through the housing top wall 286. A depending arm 295 on the inner end of the bell crank arm 280 coacts with a horizontal stop pin 296 to limit clockwise turning of the bell crank 278. As shown in Figure 4 the stop pin 296 extends through the lower end of the rear wall 287 of the housing 283. It is contemplated that the lens L, prior to grinding thereof, will be of materially greater size than the template 26. When the lens is in place between the chucks 78 and 92 and the head 21 is in its operative position the portion of the lens that is in contact with the grinding surface of the grinding wheel 39 so positions the head 21 that the template 26 is out of engagement with the anvil 273 with the result that the micro-switch 199 remains open and the motor driven gearing 24 for driving the spindles 22 and 23 is inactive. As soon as such portion of the lens is ground by the grinding wheel 39 to such an extent that the template in connection with rearward swinging of the head 21 under the influence of the spiral compression spring 100 of the toggle linkage 94 contacts the anvil 273 the bell crank 278 turns in a counterclockwise direction as viewed in Figure 4 and results in closing of the switch 199. As soon as the switch 199 is closed the motor 130 operates through the medium of the gearing 24 to drive the spindles 22 and 23 and thus cause rotation of the lens. As soon as the next following unground portion of the edge of the lens is brought into contact with the grinding surface of the grinding wheel 39 the head 21 swings forwards with the result that the template 26 moves away from the anvil 273 and the micro-switch 199 thereupon opens and stops drive of the motor driven gearing 24. When the template 26 is turned throughout a 360° arc in connection with intermittent drive of the gearing 24 the edge of the lens L, due to the grinding action of the motor driven wheel 39, has exactly the same contour as the template 26.

The housing 283 which encloses the switch 199 and supports and partially encloses the bell crank 278 is supported by, and mounted for forward and rearward sliding movement on, an inverted L-shaped bracket 297 (see Figures 1 to 3, inclusive). Such bracket is preferably in the form of a one-piece casting and consists of a horizonally extending leg 298 and a vertically extending depending leg 299. The lower portion of the vertically extending leg 299 is disposed adjacent the left hand end wall 45 of the carriage 20 and is connected thereto by horizontally extending bolts 300. The horizontally extending leg 298 of the bracket 297 is connected to, and projects outwards from, the upper end of the vertically extending leg 299. It is directly surmounted by the housing 283 and is provided at the top thereof with an elongated horizontal rib 301. The latter is of dovetailed cross section and fits within a horizontal groove 302 of similar cross section in the bottom wall 284 of the housing 283. The rib 301 and the groove 302 form a connection whereby the housing 283 is permitted to slide forwards and rearwards in order laterally to adjust the position of the anvil 273 with respect to the template 26. By shifting the anvil 273 so that it is nearer to or farther from the template 26 the size of the ground lens may be determined. If the anvil 273 is near or in close proximity to the template the lens after grinding by the wheel 39 is of large size. If the anvil 273 is shifted rearwards so that it is a greater distance from the template 26 the lens after grinding of the edge thereof by the wheel 39 is small in size. Regardless of the position of the anvil 273 with respect to the template 26 the ground lens has the same contour as the template although its size may be different. The rear end of the bottom wall 284 of the housing 283 extends rearwards of the rear end of the rib 301 and is provided with a depending lug 303.

Forward and rearward sliding movement of the housing 283 is effected by a horizontal screw shaft 304 which extends transversely of the carriage 20 and head 21 and has the central portion thereof extending longitudinally through and mounted loosely within a longitudinal bore 305 in the central portion of the bottom wall 284 of the housing 283. The rear end of the screw shaft 304 extends through a screw threaded hole in the depending lug 303. The front end of the screw shaft embodies a knurled hand wheel 306 for turning purposes and has associated with it suitable means whereby the shaft as a whole is held against axial or longitudinal displacement while at the same time it is permitted to turn readily in either direction. When the hand wheel 306 is turned in one direction it operates through the medium of the screw shaft 304 and the lug 303 to slide the housing 283 forwards and thus bring the anvil 273 closer to the template 26 and when the hand wheel 306 is turned in the opposite direction it operates to slide the housing 283 rearwards and thus cause the anvil 273 to be disposed at a greater distance from the template 26. Associated with the hand wheel 306 is a calibrated dial 307 for enabling the operator of the apparatus to determine to what extent the housing 283 must be slid in order to have the lens after grinding be of a particular size.

Associated with the template 26 is mechanism for automatically swinging the head 21 forwards into its inoperative position after the template has been turned or rotated to a predetermined extent. Such mechanism comprises a pinion 308, a spur gear 309, a ratchet wheel 310, a pawl 311, a rotary disc-like plate 312, a cam type lug 313, an arm 314, a rock shaft 315, and an arm 316. The pinion 308 is mounted in the upper end of the gear compartment 76 in the outer upper portion of the end member 53 of the head 21 and extends around and is keyed or otherwise fixedly secured to the central portion of the spindle 23. It is disposed directly outwards of the ball bearing 93 and meshes with and serves to drive the spur gear 309. The latter is located in the lower end of the gear compartment 76 and extends loosely around the central portion of a horizontally extending stub shaft 317. Such stub shaft extends lengthwise of the head 21 and has the inner end thereof connected by a screw thread connection to a socket 318 in the central portion of the head end member 53. The ratchet wheel 310 is disposed directly outwards of, and in axial alignment with, the spur gear 309 and extends loosely around the central portion of the stub shaft 317. It is disposed in the lower end of the gear compartment 76 and embodies an inwardly extending tubular hub part 319 and an outwardly extending tubular hub part 320. The inwardly extending tubular hub part 319 fits within the central aperture in the spur gear 309 and is keyed or otherwise fixedly secured to such spur gear in order that the latter and the ratchet wheel 310 rotate conjointly. The disc-like plate 312 carries the pawl 311 and is adapted to rotate conjointly with the ratchet wheel 310 when the pawl is in engagement with the latter and remains stationary when the pawl 311 is disengaged from the ratchet wheel 310. Said disc-like plate 312 is mounted rotatably in a circular opening 321 in the outer portion of the head end member 53 and has a central circular aperture 322 through which extends loosely the outwardly extending tubular hub part 320 of the ratchet wheel 310. A washer 323 and a nut 324 on the outer end of the stub shaft 317 serve to hold the disc-like plate 312 against outward displacement with respect to the stub shaft 317 and the ratchet wheel 310. On the outer marginal portion of the disc-like plate 312 is affixed an inwardly extending horizontal pin 325 which extends through, and serves as a pivot for, the proximal end of the pawl 311. The distal end of the pawl is urged into engagement with the ratchet wheel 310 by way of an arcuate wire spring 326, one end of which is in engagement with the outer portion of the distal end of the pawl 311 and the other end of which is connected to a clamp screw 327 on the disc-like plate 312. The pivoted or proximal end of the pawl is provided with an integral right angle extension 328, the purpose of which is described hereafter. The cam type lug 313 is connected to, and extends inwards from, the outer marginal portion of the disc-like plate 312 and is located directly outwards of the right angle extension 328 on the proximal end of the pawl 311. As indicated by the arrow in Figure 9, the plate 312, when the pawl 311 is in engagement with the ratchet wheel 310 and the ratchet wheel is driven, turns or rotates in a clockwise direction as viewed in such figure. The arm 314 extends upwards and is located forwards of the ratchet wheel 310. The upper end of the arm 314 is disposed externally of the gear compartment 76 and is fixedly connected to the outer end of the rock shaft 315. Such shaft extends horizontally and has its central portion journalled in a forwardly extending bearing 329 on the head end member 53. The lower end of the arm 314 is provided with a rearwardly extending finger 330 which normally projects through an arcuate slot 331 in the head end member 53 and into the lower end portion of the gear compartment 76. The arm 316 is fixedly connected to, and depends from, the inner end of the rock shaft 315 and extends forwardly at approximately a 45° angle with respect to the arm 314. It is positioned directly behind the upper rigid link 96 of the toggle linkage 94 (see Figure 4) and is arranged so that its lower end engages the lower end of such link when the head 21 is in its operative position. When the head 21 is in its operative position and the disc-like plate 312, in connection with the drive or turning of the spindle 23 by the motor driven gearing 24, turns so that the cam type lug 313 is brought into engagement with the inwardly extending finger 330 on the lower end of the arm 314, the lug by a wedging or cam action swings the arm 314 together with the arm 316 forwards. In connection with forward swinging of the arm 316 the lower end of such arm swings the upper link 96 forwards, i. e., in a counterclockwise direction as viewed in Figure 4. As soon as the two links 95 and 96 of the toggle linkage 94 swing forwards past their dead center the spiral compression spring 100 so actuates the linkage as to cause the head 21 to swing forwardly into its inoperative position. It is contemplated that the arm 316 will not swing the rigid upper link 96 forwardly past dead center relation until the trailing end of the cam type lug 313 is aligned with the inner end of the finger 330 on the lower end of the arm 314. The outer end of the pawl extension 328 is provided with a fixed outwardly extending horizontal pin 332 which extends through a radially extending slot 333 in the rotary disc-like plate 312. When the pin 332 is swung inwardly relatively to the disc-like plate 312, the pawl 311 is swung out of engagement with the ratchet wheel 310 and thus frees the ratchet wheel so that it may be turned in connection with manual rotation of the spindles 22 and 23 without rotating or angularly displacing the plate 312. An upstanding arcuate bracket 334 operates when the head 21 is swung outwardly into its inoperative position to swing the pin 332 inwardly with respect to the disc-like plate 312 so as to disengage the pawl 311 from the ratchet wheel 310. Said bracket 334 is located adjacent the left hand end of the head 21 and has the lower end thereof suitably secured to the bracket 297. The upper end of the bracket 334 is provided with a notch 335 which is adapted to receive the outer end of the pin 332 slightly before the head 21 in connection with forward swinging thereof reaches its full or complete inoperative position. In connection with final forward swinging of the head 21 into its complete inoperative position the pin 332 is arrested by the notch defining portion of the upper end of the bracket 334 with the result that the pin 332 is caused to swing inwardly with respect to the rotary disc-like plate 312 and to effect disengagement of the pawl 311 from the ratchet wheel 310.

*Operation*

When it is desired to operate the apparatus the head 21 is first swung forwardly into its inoperative position. This is done or accomplished by the operator grasping the inverted L-shaped lever 128 and swinging the latter forwardly and upwardly. As soon as the upper and lower links 95 and 96 are shifted forwardly past dead center the spiral compression spring 100 of the toggle linkage 94 by its spring action causes the linkage to complete swinging of the head 21 into its inoperative position. In connection with swinging of the head 21 into its inoperative position the L-shaped lever 175 operates as hereinbefore described, to shift the clutch part 161 into its inoperative or de-clutched position with respect to the clutch part 160 of the clutch 138. As soon as the clutch is de-clutched the spindles 22 and 23 are free so that they may be turned manually by the hand wheel 80. Also in connection with forward swinging of the head 21 into its inoperative position the bracket 334 coacts with the pin 332 to disengage the pawl 311 from the ratchet wheel 310. After swinging of the head 21 into its inoperative position the arm 88 is swung in a clockwise direction, as viewed in Figure 1, so as to slide the spindle 22 away from the spindle 23. After sliding of the spindle 22 away from the spindle 23 the lens, the edge of which is to be ground, is inserted into place between the chucks 78 and 92 on the inner ends of the two spindles and the spindles are manually turned so as properly to position the chucks with respect to the lens. As soon as the lens is properly positioned the arm 88 is released so that the spiral compression spring 81 slides the spindle 22 inwardly and results in firm clamping of the lens between the two chucks. As soon as the lens is properly mounted the main control switches for the electric motors 19, 130 and 200 are closed. Thereafter the head 21 is swung rearwardly into its operative position by urging inwardly the L-shaped lever 128. When the head 21 is in its operative position the edge of the chuck held lens engages the adjacent portion of the grinding surface 41 of the grinding wheel 39 and is ground away in connection with drive of the grinding wheel. While the head 21 is in its operative position the motor actuated mechanism 25 reciprocates or slides back and forth the carriage 20 to the end that the lens traverses the grinding surface 41, i. e., moves laterally back and forth with respect to such surface. As soon as the grinding wheel engaged portion of the edge of the lens has been ground to such an extent that the portion of the template 26 that is directly opposite the anvil 273 strikes against the anvil, the anvil moves rearwardly to a small extent and operates through the medium of the bell crank 278 to effect closing of the micro-switch 199. As soon as such switch is closed the motor actuated gearing 24 is set in motion and, through the medium of the spindles 22 and 23, rotates the lens so as to present the next following unground portion of the edge of the lens to the grinding surface of the grinding wheel. As soon as such portion comes in contact with the grinding wheel it causes the head to move slightly forwardly and results in disengagement of the template 26 from the anvil 273. As soon as the template 26 is disengaged from the anvil 273 the micro-switch 199 opens and results in stoppage of the motor driven gearing 24. The gearing 24, under control of the template 26, the anvil 273, the bell crank 278 and the micro-switch 199, operates intermittently to rotate the spindles 22 and 23 until the lens has been ground to the desired contour as determined by the shape of the template 26. At the conclusion of the lens grinding operation, i. e., after the template 26 has been turned to a predetermined extent (more than 360°) the cam type lug 313 swings into engagement with the inwardly extending finger 330 and by swinging the arms 314 and 316 outwards causes the head 21 to swing automatically forwardly into its inoperative position. If in connection with a lens grinding operation it is desired to increase or decrease the stroke of reciprocation or back and forth sliding movement of the carriage 20 and head 21 the hand wheel 271 is turned in the proper direction so as to change the position of the fulcrum forming roller 253 with respect to the lever 208. If it is desired to change the traverse position of the lens with respect to the grinding surface of the grinding wheel the hand wheel 211 is turned in one direction or the other so as longitudinally to adjust the position of the carriage 20 with respect to the screw shaft 210. As hereinbefore described, the size of the ground lens is determined by sliding the housing 283 forwardly or rearwardly by turning of the knurled hand wheel 306.

The herein described grinding apparatus effectively and efficiently fulfills its intended purpose and effects grinding at an extremely rapid rate. It is automatic in operation except for swinging of the head into its operative position after proper mounting of the lens between the chucks on the inner or opposed ends of the two spindles. Due to the particular design, arrangement and construction of its various parts the apparatus occupies but a small space and is capable of being produced at a comparatively low cost.

Whereas the apparatus has been described and illustrated in connection with grinding of the edge of an eyeglass lens it is to be understood that it may also be used equally as well to grind the edge of any other workpiece so that the workpiece has a particular shape or contour. It is also to be understood that the invention is not to be restricted to the precise details set forth since these may be modified within the scope of the appended claims without departing from the spirit and scope of the invention.

Having thus described the invention what I claim as new and desire to secure by Letters Patent is:

1. An apparatus adapted to grind the edge of a workpiece such as an eyeglass lens and comprising a supporting structure having a top wall with a slot in its front portion, a motor and grinding wheel assembly mounted on the rear portion of the top wall of the supporting structure and arranged so that the motor is in the back and the grinding wheel is at the front and overhangs the front portion of the top wall, a horizontally elongated carriage disposed adjacent to but beneath the grinding wheel, mounted on said front portion of the top wall so that it is slidable longitudinally back and forth in a horizontal plane, and provided with a fixed depending element extending downwardly through the slot, an upstanding horizontally elongated head disposed over and lengthwise of the carriage, embodying at its upper portion a pair of horizontal longitudinally extending coaxial spindles with chucks at their inner ends for gripping the workpiece therebetween, and having the lower portion thereof connected to the carriage so that it is slidable back and forth therewith and is also capable of swinging laterally relatively thereto into and out of an operative position wherein the chuck held workpiece engages the grinding wheel, mechanism operative conjointly to drive the spindles and consisting of an electric motor mounted on the head and gearing extending between, and operatively connected to, said electric motor and the spindles and also mounted on said head, and mechanism entirely independent of the first mentioned mechanism, operative when actuated while the head is in operative position to slide back and forth the carriage together with the head and thus cause the workpiece to traverse the grinding wheel, and embodying an electric motor mounted fixedly under said top wall of the supporting structure, and a horizontally extending centrally fulcrumed lever disposed under said top wall and having one end thereof operatively connected to the last mentioned electric motor and its other end operatively connected to said depending element.

2. An apparatus adapted to grind the edge of a workpiece such as an eyeglass lens and comprising a supporting structure having a top wall with a slot in its front portion, a motor and grinding wheel assembly mounted on the rear portion of the top wall of the supporting structure and arranged so that the motor is in the back and the grinding wheel is at the front and overhangs the front portion of the top wall, a horizontally elongated carriage disposed adjacent to but beneath the grinding wheel, mounted on said front portion of the top wall so that it is slidable longitudinally back and forth in a horizontal plane, and provided with a fixed depending element extending downwardly through the slot, an upstanding horizontally elongated head disposed over and lengthwise of the carriage, embodying at its upper portion a pair of horizontal longitudinally extending coaxial spindles with chucks at their inner ends for gripping the workpiece therebetween, and having the lower portion thereof connected to the carriage so that it is slidable back and forth therewith and is also capable of swinging laterally relatively thereto into and out of an operative position wherein the chuck held workpiece engages the grinding wheel, motor driven gearing mounted entirely on the head and adapted when driven conjointly to drive the spindles, and mechanism entirely independent of said motor driven gearing disposed beneath the top wall of the supporting structure, operative when actuated while the head is in its operative position to slide back and forth the carriage together with the head and thus cause the workpiece to traverse the grinding wheel, and embodying an electric motor, a horizontally extending centrally fulcrumed lever having one end thereof operatively connected to the last mentioned electric motor, and a horizontally extending elongated stroke imparting member having one end thereof pivotally connected to the other end of the lever and including at its other end a rotatable screw shaft, said screw shaft being arranged so that it extends through and is in screw threaded relation with the lower end of said depending element and being adapted when turned in one direction or the other to displace the carriage with respect to it and thus adjust the traverse position of the workpiece relatively to the grinding wheel.

3. An apparatus adapted to grind the edge of a workpiece such as an eyeglass lens and comprising a supporting structure having a top wall with a slot in its front portion, a motor and grinding wheel assembly mounted on the rear portion of the top wall of the supporting structure and arranged so that the motor is in the back and the grinding wheel is at the front and overhangs the front portion of the top wall, a horizontally elongated carriage disposed adjacent to but beneath the grinding wheel, mounted on said front portion of the top wall so that it is slidable longitudinally back and forth in a horizontal plane, and provided with a fixed depending element extending downwardly through the slot, an upstanding horizontally elongated head disposed over and lengthwise of the carriage, embodying at its upper portion a pair of horizontal longitudinally extending coaxial spindles with chucks at their inner ends for gripping the workpiece therebetween, and having the lower portion thereof connected to the carriage so that it is slidable back and forth therewith and is also capable of swinging laterally relatively thereto into and out of an operative position wherein the chuck held workpiece engages the grinding wheel, and motor driven gearing mounted entirely on the head and adapted when driven conjointly to drive the spindles, and mechanism entirely independent of said motor driven gearing disposed wholly beneath the top wall of the supporting structure, operative when actuated while the head is in its operative position to slide back and forth the carriage together with the head and thus cause the workpiece to traverse the grinding wheel, and consisting of an electric motor mounted under the top wall of the supporting structure and an operating connection extending between said electric motor and the carriage, said operating connection embodying a horizontally disposed elongated lever with a longitudinal slot in its central portion and in addition a fulcrum in the slot and a horizontally disposed elongated stroke imparting member with one end thereof pivotally connected to one end of the lever and its other end in the form of a rotatable screw shaft extending through, and in screw threaded relation with, the lower end of said depending element, and having associated therewith manually manipulatable means in the form of a horizontal screw shaft operatively connected to the fulcrum and a hand wheel in connected relation with the screw shaft, whereby during actuation of said mechanism the fulcrum may be adjusted lengthwise of the lever in order to increase or decrease the length of the back and forth sliding stroke of the carriage, said first mentioned screw shaft having a hand wheel at its outer end and being adapted when turned in one direction or the other so to displace the carriage with respect to it as to adjust the traverse position of the workpiece relatively to the grinding wheel.

4. An apparatus adapted to grind the edge of a workpiece such as an eyeglass lens and comprising a supporting structure, a grinding wheel mounted on the supporting structure and provided with driving means therefor, a horizontally elongated carriage disposed adjacent to but beneath the grinding wheel and mounted on the supporting structure so that it is slidable longitudinally back and forth in a horizontal plane, an upstanding horizontally elongated head disposed over and lengthwise of the carriage, embodying at its upper portion a pair of horizontal longitudinally extending coaxial spindles with chucks at their inner ends for gripping the workpiece therebetween, and having the lower portion thereof connected to the carriage so that it is slidable back and forth therewith and is also capable of swinging laterally back and forth between an operative position wherein the chuck held workpiece engages the grinding wheel and an inoperative position wherein the workpiece is out of engagement with said grinding wheel, motor driven gearing mounted on the head and adapted when driven conjointly to drive the spindles, motor actuated mechanism mounted on the supporting structure and operative when actuated while the head is in its operative position to slide back and forth the carriage together with the head and thus cause the workpiece to traverse the grinding wheel, and an upstanding toggle linkage comprising a lower spring variety compound link having its lower end pivotally connected to the carriage and upper rigid link provided with a rigid hand lever for swinging purposes and having its upper end pivotally connected to the upper portion of the head and its lower end pivotally connected to the upper end of the lower link, said linkage being arranged and designed so that when the links are shifted in one direction past dead center in response to swinging of the upper rigid link by the lever they serve yieldingly to hold the head in its operative position and when the links are shifted in the opposite direction past dead center in response to reverse swinging of said upper rigid link by said lever they serve to hold the head in its inoperative position.

5. An apparatus adapted to grind the edge of a workpiece such as an eyeglass lens and comprising a supporting structure, a grinding wheel mounted on the supporting structure and provided with driving means therefor, a horizontally elongated carriage disposed adjacent to but beneath the grinding wheel and mounted on the supporting structure so that it is slidable longitudinally back and forth in a horizontal plane, an upstanding horizontally elongated head disposed over and lengthwise of the carriage, embodying at its upper portion a pair of horizontal longitudinally extending coaxial spindles with chucks at their inner ends for gripping the workpiece therebetween, and having the lower portion thereof connected to the carriage so that it is slidable back and forth therewith and is also capable of swinging laterally back and forth between an operative position wherein the chuck held workpiece engages the grinding wheel and an inoperative position wherein the workpiece is out of engagement with said grinding wheel, motor driven gearing mounted on the head and adapted when driven conjointly to drive the spindles, motor actuated mechanism mounted on the supporting structure and operative when actuated while the head is in its operative position to slide back and forth the carriage together with the head and thus cause the workpiece to traverse the grinding wheel, and an upstanding toggle linkage comprising a lower spring variety compound link with its lower end pivotally connected to the carriage and an upper rigid link with its upper end pivotally connected to the upper portion of the head and its lower end pivotally connected to the upper end of the lower link, arranged and designed so that when the links are shifted in one direction past dead center they serve yieldingly to hold the head in its operative position and when the links are shifted in the opposite direction past dead center they serve to hold the head in its inoperative position, and having readily accessible manually manipulatable means associated therewith for adjusting the loading of the spring of the compound link in order that when the head is in its operative position the force tending to hold the workpiece against the grinding wheel may be varied.

6. An apparatus adapted to grind the edge of a workpiece, such as an eyeglass lens, and comprising a supporting structure, a grinding wheel mounted on the supporting structure and provided with drive means therefor, a carriage disposed adjacent to the grinding wheel and mounted on the supporting structure so that it is slidable back and forth, a head associated with the carriage, embodying on one portion thereof a pair of coaxial spindles with means at their inner ends for gripping the workpiece therebetween, and having another of its portions connected to the carriage so that it is slidable back and forth therewith and is also capable of swinging laterally into and out of an operative position wherein the workpiece engages the grinding wheel, means mounted entirely on the head, adapted conjointly to drive the spindles, and embodying an electric motor, gearing extending between, and operatively connected to, the motor and spindles, and a clutch included in said gearing, consisting of relatively movable coacting clutch parts adapted when the parts thereof are moved relatively to one another in one direction to assume a clutched position wherein it establishes a driving connection between the motor and the spindles, and further adapted when the parts thereof are moved relatively to one another in the opposite direction to assume a de-clutched position wherein it permits the spindles to be turned manually independently of said motor, a clutch controlling lever pivotally mounted on the head and so operatively connected to one of the coacting clutch parts that when it is swung in one direction relatively to the head it effects shift of the clutch into its clutched position and when it is shifted in the opposite direction relatively to the head it effects shift of the clutch into its de-clutched position, a device mounted on the carriage adjacent the lever and so arranged that when the head is shifted out of its operative position it operates automatically to swing the lever in its said other direction in order to effect shift of the clutch into its de-clutched position, and motor actuated mechanism mounted on the supporting structure and operative when actuated while the head is in its operative position to slide back and forth the carriage together with the head and thus cause the workpiece to traverse the grinding wheel.

7. An apparatus adapted to grind the edge of a workpiece such as an eyeglass lens and comprising a supporting structure, a grinding wheel mounted on the supporting structure and provided with driving means therefor, a horizontally elongated carriage disposed adjacent to but beneath the grinding wheel and mounted on the supporting structure so that it is slidable longitudinally back and forth in a horizontal plane, an upstanding horizontally elongated head disposed over and lengthwise of the carriage, embodying at its upper portion a pair of horizontal longitudinally extending coaxial spindles with chucks at their inner ends for gripping the workpiece therebetween, and having the lower portion thereof connected to the carriage so that it is slidable back and forth therewith and is also capable of swinging laterally into and out of an operative position wherein the chuck held workpiece engages the grinding wheel, means mounted entirely on the head, adapted conjointly to drive the spindles and embodying an electric motor, worm gearing connected for drive by the motor, spur gearing connected to drive the spindles, and a clutch disposed between the worm gearing and the spur gearing, consisting of relatively movable coacting clutch parts adapted when the parts thereof are moved relatively to one another in one direction to assume a clutched position wherein it establishes a driving connection between the worm gearing and the spur gearing, and further adapted when the parts thereof are moved relatively to one another in the opposite direction to assume a de-clutched position wherein it permits the spindles together with the spur gearing to be turned manually independently of said worm gearing and motor, a clutch controlling lever pivotally mounted on the head and so operatively connected to one of the coacting clutch parts that when it is swung in one direction relatively to the head it effects shift of the clutch into its clutched position and when it is swung in the opposite direction relatively to the head it effects shift of the clutch into its de-clutched position, a device mounted on the carriage adjacent the lever, arranged so that when the head is swung out of its operative position it automatically swings the lever into its said opposite position relatively to the head and when the head is swung into its operative position it operates automatically to swing the lever in its said one direction relatively to the head and also arranged so that when the head is in its operative position the lever may be swung manually in either direction, and motor actuated mechanism independent of the spindle driving means, mounted on the supporting structure and operative when actuated while the head is in its operative position to slide back and forth the carriage together with the head and thus anvil and through the medium of said anvil moves the bell crank in the opposite direction, the switch for the motor being positioned adjacent the other arm of the bell crank and being so operatively connected thereto that it automatically closes when the bell crank moves in said opposite direction due to engagement of the template with the anvil and automatically opens when said bell crank moves in said one direction in response to the action of said spring means upon disengagement of the template from said anvil, and a unitary support for the bell crank and switch mounted so that it may be slid bodily and rectilinearly back and forth in such manner as to adjust the normal position of the anvil with respect to the template and thus regulate the size of the finally ground workpiece.

9. An apparatus adapted to grind to a predetermined contour the edge of a workpiece such as an eyeglass lens and comprising a supporting structure, a grinding wheel mounted on the supporting structure and provided with driving means therefor, a horizontally elongated carriage disposed adjacent to but beneath the grinding wheel and mounted on the supporting structure so that it is slidable longitudinally back and forth in a horizontal plane, an upstanding horizontally elongated head disposed over and lengthwise of the carriage, embodying at its upper portion a pair of horizontal longitudinally extending coaxial spindles with chucks at their inner ends for gripping the workpiece therebetween, having the lower portion thereof connected to the carriage so that it is slidable back and forth therewith and is also capable of swing laterally into and out of an operative position wherein an edge portion of the chuck held workpiece engages the grinding wheel, and provided with means for yieldingly urging it into its operative position, means mounted entirely on the head, adapted when the head is in its operative position conjointly to drive the spindles so as to revolve the workpiece and successively bring the other portions of its edge into engagement with the grinding wheel, and embodying an electric motor and gearing between the motor and the spindles, motor actuated mechanism mounted on the supporting structure and operative when actuated structure and provided with driving means therefor, a head disposed adjacent to the grinding wheel, embodying on one portion thereof a pair of coaxial spindles with means at their inner ends for gripping the workpiece therebetween, and having another of its portions mounted so that it is capable of swinging laterally back and forth between an operative position wherein the workpiece engages the grinding wheel and an inoperative position wherein the workpiece is out of engagement with said grinding wheel, motor driven gearing mounted on the head and adapted when driven conjointly to drive the spindles, a toggle linkage extending between the supporting structure and the head, comprising a spring variety compound link and a rigid link with one end thereof connected pivotally to one end of the compound link, and arranged and designed so that when the links are shifted in one direction past dead center they serve yieldingly to hold the head in its operative position and when the links are shifted in the opopsite direction past dead center they serve to hold the head in its inoperative position, a part movably mounted on the head adjacent the toggle linkage and arranged so that when it is moved in one direction it operates to shift the links in said opposite direction past dead center, and means driven and actuated by one of the spindles and operative automatically after grinding of the workpiece to a predetermined extent by the grinding wheel to move said movably mounted part in said one direction.

References Cited in the file of this patent

UNITED STATES PATENTS

| Number | Name | Date |
|---|---|---|
| 286,429 | Haigis | Oct. 9, 1883 |
| 656,685 | Wilhelm | Aug. 28, 1900 |
| 686,676 | Long | Nov. 12, 1901 |
| 737,313 | Bader | Aug. 25, 1903 |
| 739,264 | Long et al. | Sept. 15, 1903 |
| 772,785 | Clarke | Oct. 18, 1904 |
| 842,676 | Lavallee | Jan. 29, 1907 |
| 900,664 | Clark | Oct. 6, 1908 |
| 1,117,920 | Sink | Nov. 17, 1914 |
| 1,227,243 | Bugbee | May 22, 1917 |
| 1,430,625 | Carlson | Oct. 3, 1922 |
| 1,490,178 | Maynard et al. | Apr. 15, 1924 |
| 1,630,264 | Gunning | May 31, 1927 |
| 1,636,469 | Fisher | July 19, 1927 |
| 1,713,622 | Rakel | May 21, 1929 |
| 2,233,312 | Harrold | Feb. 25, 1941 |
| 2,268,159 | McCabe et al. | Dec. 30, 1941 |
| 2,321,383 | Harper | June 8, 1943 |
| 2,414,126 | Sevin | Jan. 14, 1947 |
| 2,528,137 | Grasser | Oct. 31, 1950 |
| 2,579,337 | Reaser et al. | Dec. 18, 1951 |

FOREIGN PATENTS

| Number | Country | Date |
|---|---|---|
| 236,959 | Great Britain | Sept. 9, 1926 |
| 241,302 | Great Britain | Oct. 22, 1925 |
| 470,658 | Great Britain | Aug. 19, 1937 |
| 512,104 | Great Britain | Aug. 29, 1939 |
| 627,636 | France | June 13, 1927 |